United States Patent [19]
Chamberlin

[11] 4,222,103
[45] Sep. 9, 1980

[54] REAL TIME CAPTURE REGISTERS FOR DATA PROCESSOR

[75] Inventor: George P. Chamberlin, Tempe, Ariz.

[73] Assignee: Motorola, Inc., Schaumburg, Ill.

[21] Appl. No.: 945,737

[22] Filed: Sep. 25, 1978

[51] Int. Cl.³ .............................................. G06F 7/00
[52] U.S. Cl. .................................... 364/200; 235/92 T
[58] Field of Search .................................... 235/92 T; 364/900 MS File, 200 MS File, 300; 307/208, 213, 293

[56] References Cited

U.S. PATENT DOCUMENTS

| 3,984,815 | 10/1976 | Drexler et al. | 235/92 T |
| 4,128,892 | 12/1978 | Vasa | 235/92 T |
| 4,142,680 | 3/1979 | Oswald et al. | 235/92 T |

Primary Examiner—Leo H. Boudreau
Attorney, Agent, or Firm—Walter W. Nielsen

[57] ABSTRACT

A microprocessor is disclosed which includes a timer and one or more capture registers. The timer is a counter which is incremented continuously at a fixed clock rate for providing a real time reference. Each capture register is loaded directly from the timer output when a triggering signal appears on a specific input pin, thus recording the time of the occurrence of the triggering signal without interrupt or software intervention.

13 Claims, 26 Drawing Figures

| FIG. 3A | 3B | 3C | 3D | 3E | 3F |
|---|---|---|---|---|---|
| 3G | 3H | 3I | 3J | 3K | 3L |

| 3M | 3N | 3O | 3P | 3Q | 3R | 3S | 3T | 3U |
|---|---|---|---|---|---|---|---|---|

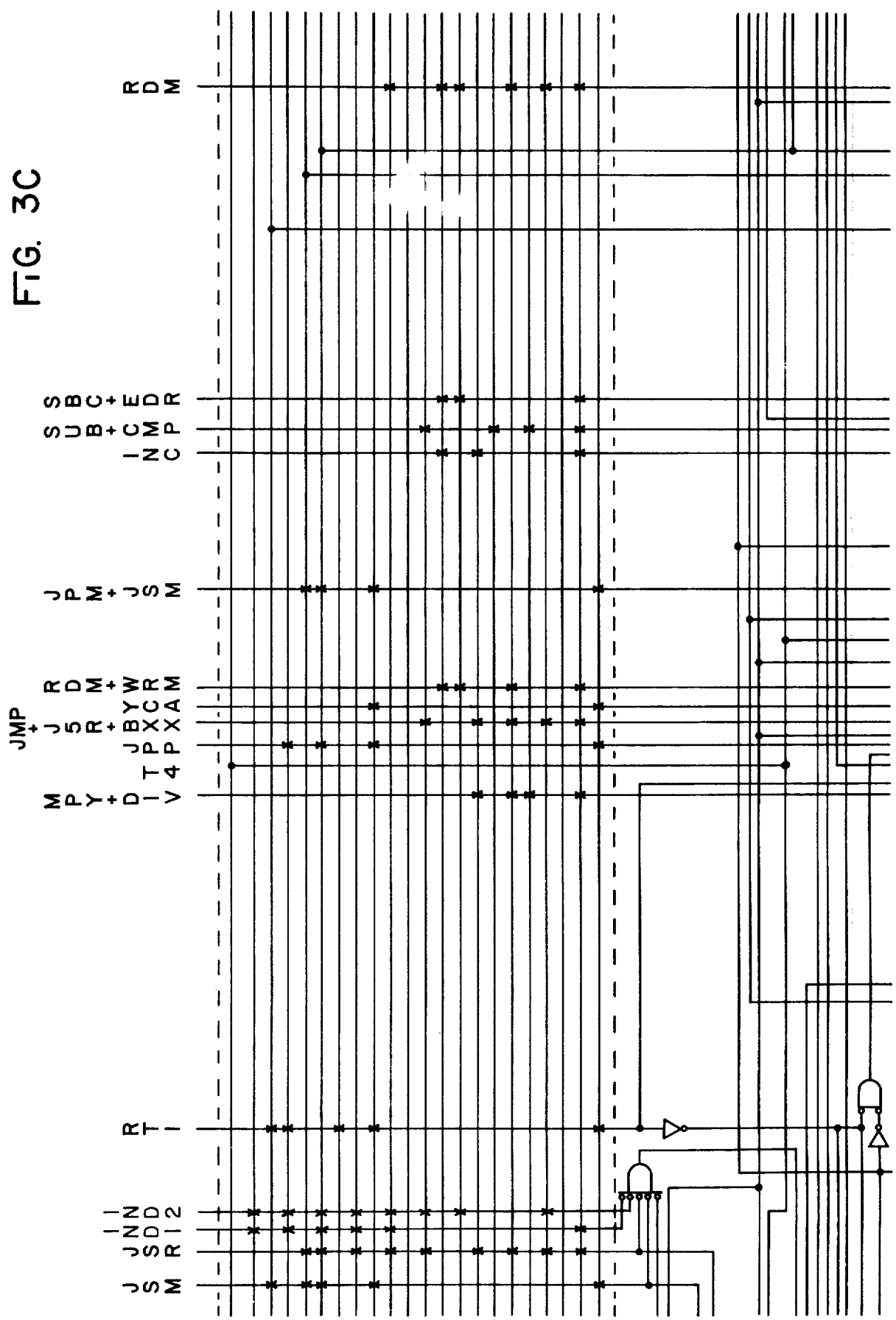

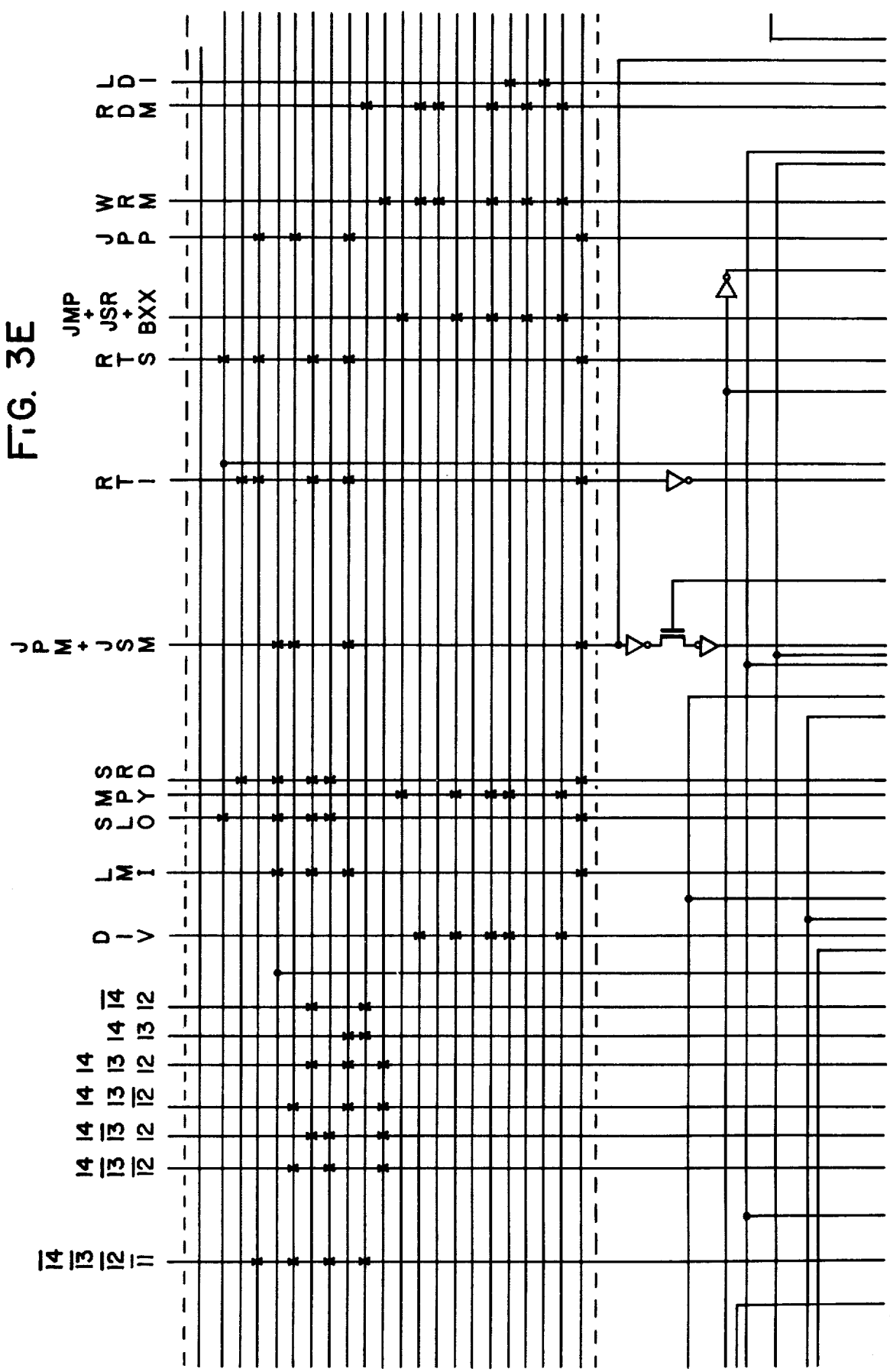

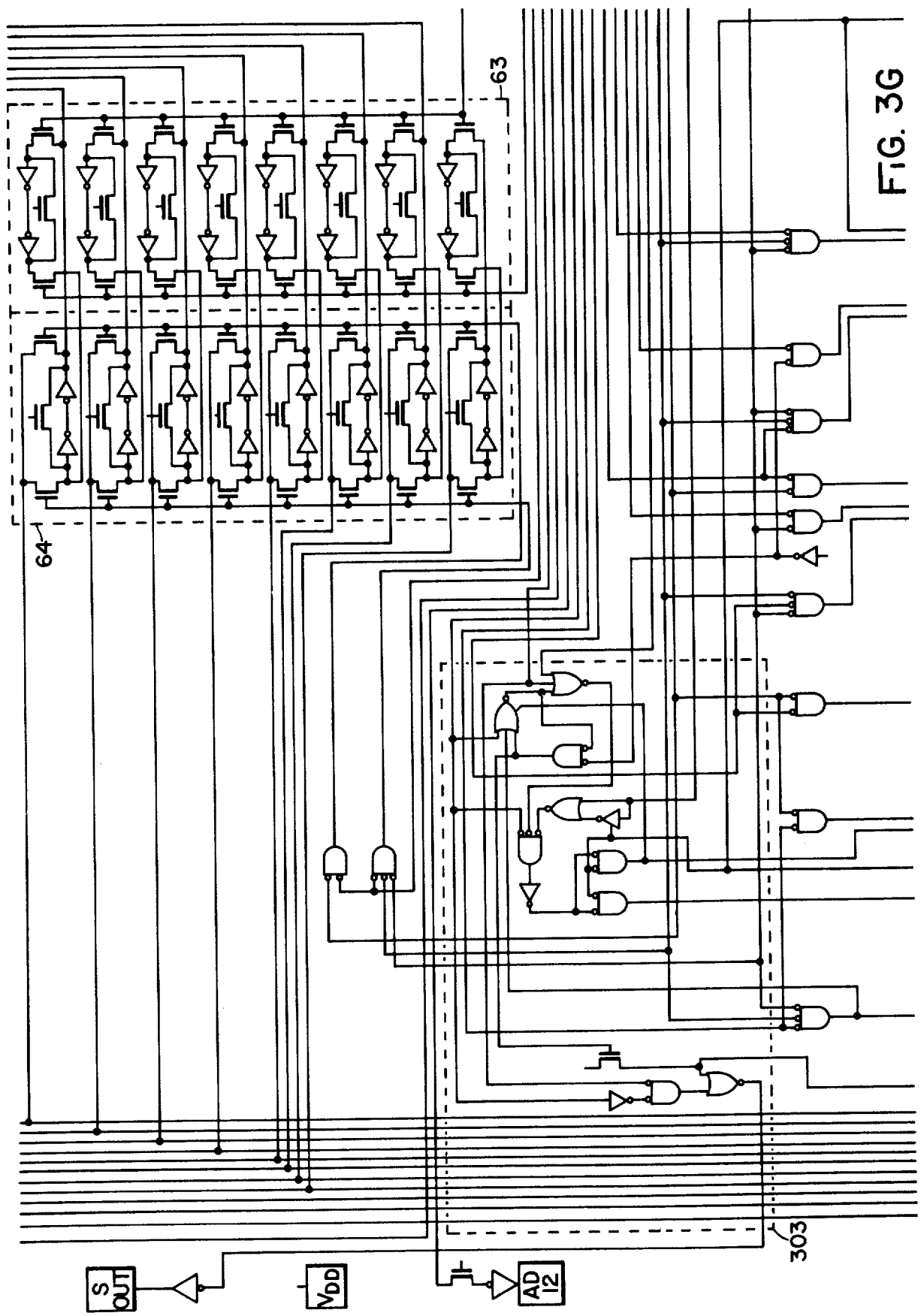

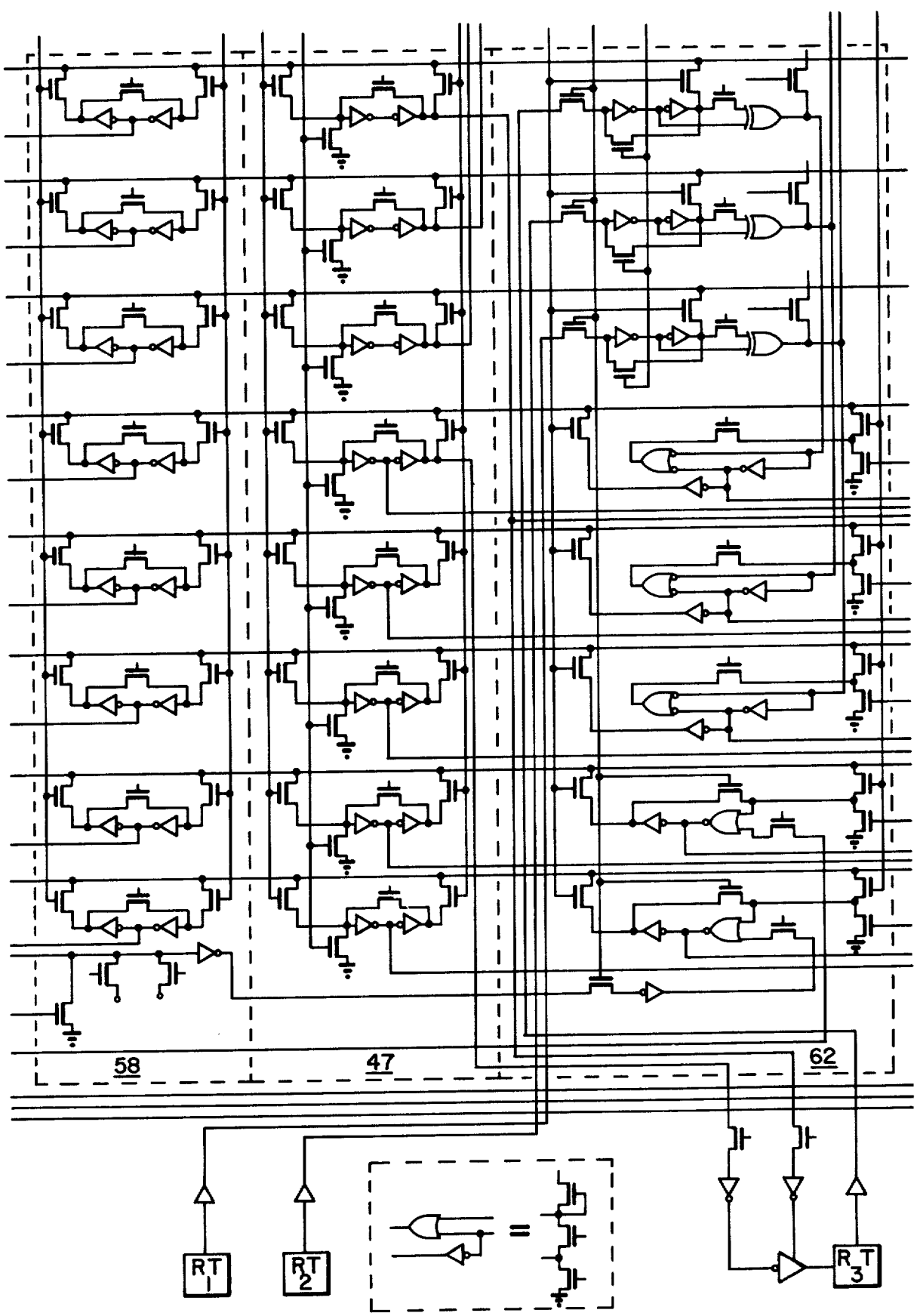
FIG. 3-O

REAL TIME CAPTURE REGISTERS FOR DATA PROCESSOR

CROSS REFERENCE TO RELATED APPLICATIONS

1. "Architecture For Data Processor" invented by George Chamberlin, bearing Ser. No. 946,222, filed on even date herewith and assigned to the assignee of the present invention.

2. "Microprocessor Having Instruction Fetch and Execution Overlap" invented by George Chamberlin, bearing Ser. No. 946,221, filed on even date herewith and assigned to the assignee of the present invention.

BACKGROUND OF THE INVENTION

1. Field of the Invention

This invention relates generally to data processors and more particularly to a data processor suitable for processing signals which occur in real time.

2. Description of the Prior Art

Data processors which execute a plurality of instructions stored in a memory are well known in the art. Generally the instructions are stored in consecutive memory locations, and the instructions are executed in the order in which they are stored. The manner of executing consecutively stored instructions can be altered by the software itself, as for example, when a jump, branch, or jump-to-subroutine instruction is executed. However, the execution of consecutively stored instructions may also be altered by a hardware interrupt, as for example when some external event occurs which causes an input to the data processor to change state. Generally when the hardware interrupt occurs, the data processor stops executing the group of instructions which it was previously executing, and the data processor is redirected to a different group of instructions which are specifically related to the occurrence of the external event which caused the interrupt. However, there will be certain times at which it is undesirable for the data processor to be interrupted as, for example, when the data processor is already busy handling a prior interrupt. For this reason, data processors often include masking circuitry for selectively enabling or disabling one or more interrupts during those times when it is desirable or undesirable, respectively, for the data processor to recognize the interrupt.

A problem which arises when interrupts are not immediately recognized is that the time at which the interrupt occurs may be critical in determining the action to be taken by the data processor; yet, because the recognition of the interrupt is deferred, and because the external event occurred in real time, the data processor has no record of the time at which the interrupt occurred.

SUMMARY OF THE INVENTION

It is an object of this invention to provide a data processor having means for recording the time at which one or more external events occur for later use by the data processor.

It is also an object of this invention to provide a data processor having means for recording the time at which one or more external events occur without causing an interruption of the execution of instructions within the data processor.

Accordingly, one embodiment of the invention relates to a data processor including a timer which is clocked at a continuous rate to provide a digital indication of time, detection circuitry for recognizing the occurrence of an external event, one or more storage units coupled to the timer for storing the digital indication of time that is present when the external event is recognized by the detection circuitry, and a digital bus coupled to the one or more storage units for accessing the contents of each storage unit. The timer, detection circuitry and one or more storage units are suitable for recording the time at which one or more external events occur independently of the software instructions currently being executed by the microprocessor. The microprocessor can later access the recorded times via the digital bus for processing an appropriate response to the occurrence of the one or more external events.

DESCRIPTION OF THE PREFERRED EMBODIMENT

Figure 1:
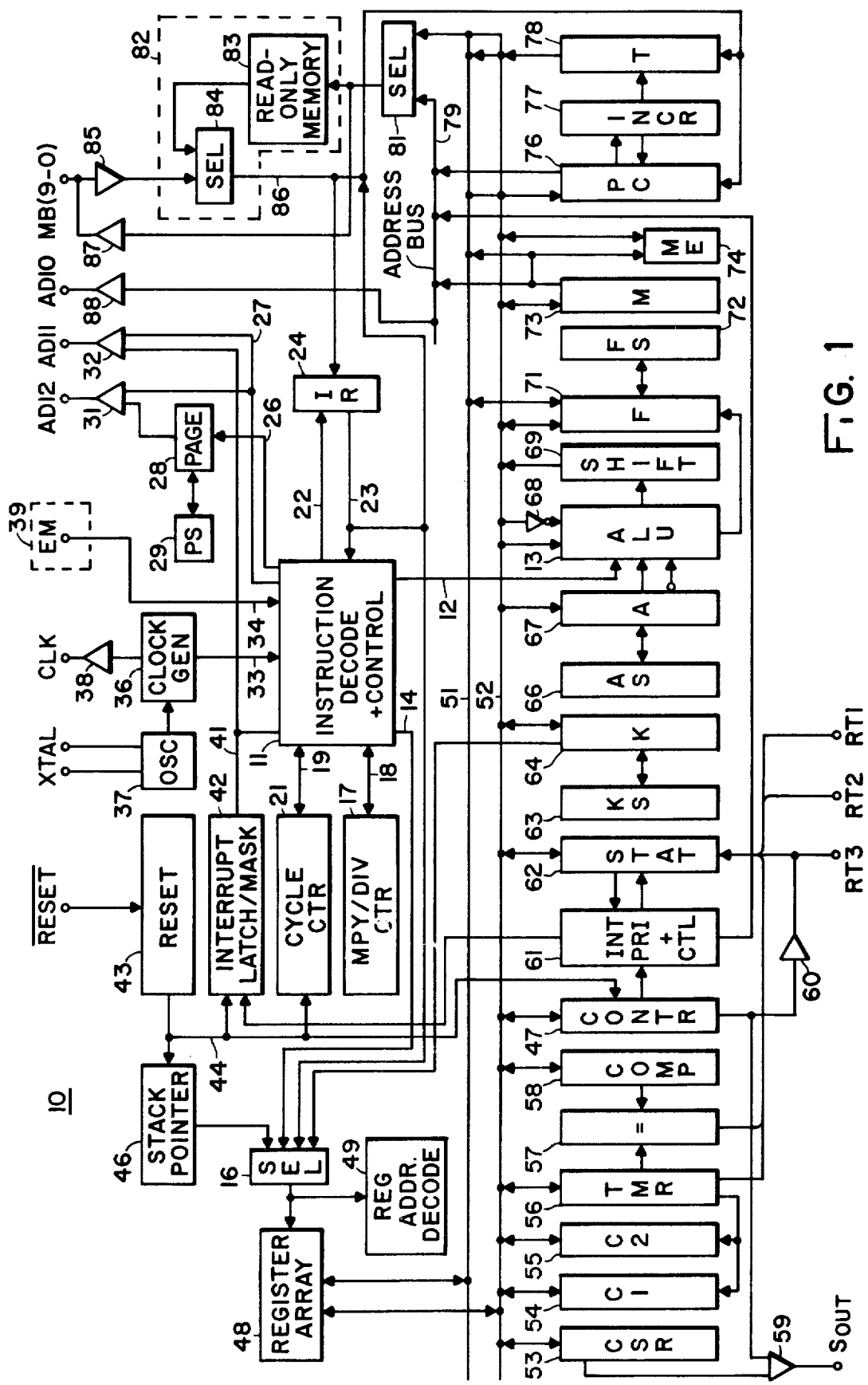
FIG. 1 is a block diagram of a microprocessor including a preferred embodiment of the invention.

There is illustrated, in FIG. 1, an eight-bit digital data processor having control logic, an arithmetic-logic unit, input/output, and memories. The architecture and instruction set of digital data processor 10 are general purpose yet directed to controller applications. The input/output functions of digital data processor 10 are handled through a group of special purpose registers which are addressed in the same manner as other processor registers. Thus it is possible to program the input/output logic for a specific controller application or for more general applications. Processor system 10 can address up to 8192 ten-bit words of memory for instructions and data. Normally this memory will be a read-only-memory (ROM) with variable data being stored in register array 48. Register array 48 contains a plurality of eight-bit data storage registers arranged in an array for handling variable data. Included in register array 48 are four processor special purpose registers 64, 71, 73 and 74, along with seven input/output registers 53, 54, 55, 56, 58, 47, and 62; the other data storage registers are preferably in the form of a random-access-memory (RAM). Additional data storage external to microprocessor 10 can be accessed via memory bus MB. Memory bus MB has ten bidirectional lines which can be used to transfer a portion of a memory address from data processor 10 to external memory, as will be explained later. Memory bus MB can be used to transfer instructions from external memory to data processor 10 and can also be used to transfer data between data processor 10 and external memory. The memory bus MB can also be coupled to other peripheral circuitry to serve as a general input/output bus.

Instruction decode and control 11 decodes instructions and controls operation of data processor 10, and accordingly, is coupled to many circuits within data processor 10. Addressed instructions are first latched in instruction register 24 after being fetched from memory for decoding by instruction decode and control 11. Line 22 is shown as being coupled from instruction decode and control block 11 to instruction register 24 and is operative during interrupts as will be explained later. Instruction decode and control 11 is coupled to arithmetic and logic unit 13 by a plurality of lines 12. An output line 14, from instruction decode and control 11, is connected to selector 16. The function of line 14 is to force an address on the output of selector 16 when an interrupt occurs. Multiply/divide counter 17 is coupled to instruction decode and control 11 by line 18 and is used to control multiple passes through the arithmetic and logic unit 13 for multiply and divide operations. Line 19 couples cycle counter 21 to instruction decode and control 11. Cycle counter 21 is a latch used to distinguish a first cycle from a second cycle in two cycle instructions. Although in FIG. 1 there is generally only one line shown between the different blocks, it will be understood that there may actually be more than one conductor interconnecting the blocks in a physical embodiment.

Instruction register 24 has an output line 23 which is connected to instruction decode and control 11, selector 16, temporary storage register 78, and program counter register 76. The bits latched in instruction register 24 may represent an operation code to be decoded by instruction decode and control 11. Alternatively, bits latched in instruction register 24 may represent the address of a data register in register array 48, and selector 16 enables this address into register array 48. Also, for certain two-cycle instructions, one of the bits latched in instruction register 24 during the first cycle must merge with the ten bits which are read during the second cycle in order to form an eleven bit input to either program counter register 76 or temporary storage register 78. Page latch or flip-flop 28 is coupled to instruction decode and control 11 by line 26. A page stack 29 is coupled to page latch 28 so that when an interrupt occurs the page status that was in latch 28 can be stored in page stack 29. Page flip-flop 28 is coupled to buffer 31 which has an output AD12, the most significant bit of the memory address. Output AD11 is coupled by buffer 32 and line 27 to instruction decode and control 11. Output AD11 is controlled by an interrupt mask bit provided by line 41 and interrupt latch/mask 42, and in conjunction with output AD12 provides two pages of foreground software in memory for the handling of interrupts and two pages of background software in memory for the handling of programmed operations between interrupts. Page address bits AD11 and AD12 address one of four pages of 2048 words. AD11 and AD12 remain stable during an entire memory cycle.

Oscillator 37 has two external connections labeled XTAL. These are connections for an oscillator crystal. A series resonant fundamental crystal, AT cut, can be connected between the two XTAL terminals to regulate internal oscillator operation. If it is desired to use an external oscillator then a square wave source can be connected to one of the XTAL connections and the other connection should be left open. Oscillator 37 is coupled to clock generator 36. Clock generator 36 provides all the internal clock signals for data processor 10. Clock generator 36 also provides an output labeled CLK which is buffered by buffer 38. When clock output CLK is a high level it indicates that memory bus MB contains a memory address. When clock output CLK is a low level it indicates that memory bus MB contains data. During a memory write instruction, when clock output CLK is low, processor 10 can place data on memory bus MB; for instructions other than memory write, external circuitry can place data on memory bus MB when the clock output CLK is low. Clock generator 36 is coupled to instruction decode and control 11 by line 33 for properly timing the generation of the various control outputs.

In the preferred embodiment, package pin limitations preclude the use of a Read/Write signal for indicating data direction on memory bus MB during the second half of a machine cycle when CLK is low. Therefore, Read/Write memories providing external variable data storage, as well as other peripheral parts coupled to memory bus MB, may require the use of one of the address bits to indicate data direction in order to make use of the memory write instruction.

Microprocessor or data processor 10 can contain an internal on chip read-only-memory 83 which is enclosed within dotted lines 82. When processor 10 contains an internal read-only-memory 83 then an input is needed on terminal EM, enclosed within dotted line 39, so that processor 10 will know whether a memory read instruction pertains to internal read-only-memory 83 or to an external memory. A high level on input EM during the data portion of the clock cycle (i.e., clock signal CLK is low) indicates that the address location is external to processor 10 and internal read-only-memory 83 will be ignored and data on memory bus MB will be read. A low level applied to input terminal EM during the data portion of the clock cycle causes internal read-only-memory 83 to be read except during a read memory instruction. The read memory instruction has a three bit field which can be used to increment or decrement M register 73 which proves useful for table look-up schemes. However, the logic is such that if all three bits are logic ones then M register 73 is not incremented (or is incremented by zero) and data is read from external memory bus MB rather than from internal memory 83. This allows greater flexibility in the use of processor 10.

Memory bus MB is coupled by buffer 85 to selector 84. Selector 84 selects either external data coming in on memory bus MB or data from read-only-memory 83 to be coupled onto line 86. Line 86 is connected to instruction register 24, to program counter 76, and to temporary register 78. Read-only-memory 83 would typically be a 1K by ten-bit memory. Within this description of the preferred embodiment, memory sizes will often be abbreviated as 1K, 2K, etc. It will be understood by those skilled in the art that 1K is an abbreviation for 1024 words of memory, 2K is an abbreviation for 2048 words of memory, etc. It should be noted that if it is not desirable to have a read-only-memory on the same integrated circuit chip with processor 10 then the elements contained within dotted lines 39 and 82 would be omitted and the output of buffer 85 would be directly connected to line 86. When processor 10 contains read-only-memory 83, register array 48 may have fifty-two directly addressable eight-bit registers. If processor 10 does not have read-only-memory 83, then register array 48 may be expanded to 127 directly addressable eight-bit registers while maintaining the same overall chip area.

Interrupt latch/mask 42 is coupled by line 41 to instruction decode and control 11 and to AD11 output buffer 32. Interrupt latch/mask 42 is an intermediate temporary storage, used solely for internal timing purposes, and is set when an interrupt occurs. Interrupt latch/mask 42 is reset when reset latch 43 receives an input signal on the $\overline{\text{RESET}}$ terminal. $\overline{\text{RESET}}$ is an active low signal and initializes processor 10, and to ensure proper reset, it must be held low for a minimum of ten full clock cycles. Reset latch 43 provides an output on line 44 to reset stack pointer 46, cycle counter 21, and to clear control register 47. The page bit in page latch 28 is also reset by the output from reset latch 43, however, this connection is not shown in FIG. 1 to avoid overcrowding the drawing. When control register 47 is cleared, all interrupts are disabled and output terminal RT3 is placed in an input mode and output SOUT is placed in a static mode with a zero output. These functions will be described in greater detail hereinafter. Another function performed by the reset signal is to force a jump-to-subroutine (JSR) op code into instruction register 24 and also to force a vector address of zero onto address bus 79 so that the jump address can be fetched to complete the JSR instruction; then the JSR instruction causes program counter 76 to be loaded with the contents of memory location zero and causes an instruction fetch to be initiated.

Stack pointer 46 is coupled to selector 16. Selector 16 selects which of its four inputs is coupled to the address input of register array 48. Selector 16 receives three inputs from stack pointer 46, seven inputs from instruction register 24, seven inputs from K register 64, and a forced address, for interrupt purposes, on line 14 which is received from instruction decode and control 11. The output of selector 16 is coupled to register array 48 and to register address decoder 49. Register address decoder 49 is used to decode the address for registers 47, 53-56, 58, 62, 64, 71, 73, and 74. Register array 48 is coupled to data buses 51 and 52. Data bus 52 is an eight-bit bus. Data bus 51 is a three-bit bus and serves to expand data bus 52 to provide an eleven-bit data bus for a portion of processor 10.

The registers in register array 48 are logically divided into two groups by the addressing capabilities of the instruction set and certain of the registers have special purpose functions. The first register is designated as register R1 and the rest of the registers are designated in an ascending manner. There is no register designated register zero. The registers in register array 48 are addressed directly via bits in the instruction word or indirectly via K register 64. A register address of zero specifies indirect addressing since there is no register zero and the contents of K register 64 are used as the true register address. Registers 1 through 31 are designated as scratch pad registers while registers numbered from thirty-two up are designated auxiliary registers. In addition to the eight-bit registers, register array 48 contains nine eleven-bit registers. Eight of the nine eleven-bit registers are used as program counter stack and the ninth eleven-bit register is used as an M register single-level stack for registers 73 and 74. When an interrupt is initiated, instruction decode and control block 11 forces the register array address of the ninth eleven-bit register onto line 14 which is then selected by selector 16 to cause the contents of M register 73 and ME register 74 to be saved in the ninth eleven-bit register. The program counter stack is used to store the contents of the program counter 76 prior to updating program counter 76 with a jump address. The stack pointer 46 is a three-bit register and is used to address the program counter stack to save the current program counter value in the addressed location when a subroutine or an interrupt occurs.

Command shift register 53 is coupled to data bus 52 and to buffer output driver 59. Buffer output driver 59 provides output SOUT. Driver 59 can be programmed to operate as a clocked bit-serial data output or as a static (DC) output by means of two control bits in I/O control register 47. In the serial output mode the serial data comes from command shift register 53. Shift register 53 is eight-bits in length but the data transmitted will always be preceded by a ninth bit, which is a start bit, and always a logic level "1." Data loaded into command shift register 53 via data bus 52 is shifted out following the start bit and is shifted least-significant bit first. Shifting clears register 53 to "0's" and SOUT output will be held at a zero or low level until command shift register 53 is reloaded or its mode of operation is changed. Register 53 has a shift immediate and a shift timed mode. When the shift immediate mode is selected, transmission of data on SOUT output line begins on the machine cycle following the cycle in which a data byte is written into shift register 53 or during the cycle following a write instruction to I/O control register 47 to select the shift immediate mode. When the shift timed mode is selected, transmission begins during the cycle in which timer register 56 becomes equal to a value stored in compare register 58. Thus the time mode permits a command byte to be transmitted at a specific time under software control. In either shift mode, transmission begins with the start bit. All data transitions on SOUT output line occur on the negative going edge of clock signal CLK. The shift rate is one-bit per machine cycle. In the static mode, register 53 does not shift and may then be used as a normal register. Command shift register 53 may be read from or written into by software control via data bus 52. Writing into it during the interval in which it is transmitting data may destroy the integrity of that data. Since command shift register 53 is not initialized by reset a valid byte should be stored in it before one of the shift modes is set.

Capture registers 54 and 55 are coupled to data bus 52 and to timer 56. Capture registers 54 and 55 are loaded directly from timer 56 when a signal transition (low to high, or high to low) occurs on inputs RT1 or RT2. Input RT1 controls loading of capture register 54, while input RT2 controls loading of capture register 55. Each capture register therefore always holds the time, as indicated by timer 56, at which the most recent transition occurred on the corresponding real time input line RT1 or RT2. Signal transitions on inputs RT1 or RT2 will also generate interrupts to alert the software that an input event has occurred. These interrupts are individually maskable by software via control register 47. Capture registers 54 and 55 may be read from or stored to by software via data bus 52, and neither operation will affect the capture function, however, storing will of course destroy the last captured value. A third real time input, RT3, may be programmed to operate as an input or an output by means of two control bits in I/O control register 47. In the input mode the interrupt can be inhibited or enabled while in the output mode the output can be low or high. When in the input mode, bit three of I/O status register 62 will be set when any signal transition occurs on terminal RT3. An interrupt will be generated if the interrupt has not been inhibited. When in the input mode, output buffer 60 is held in the high impedance (off) state. When in the output mode RT3 output will be driven high or low according to bit three in control register 47.

Timer register 56 is an eight-bit register that is incremented by one at a continuous rate by an input from clock generator 36. A metal-mask option is provided so that the rate at which timer register 56 is incremented can be chosen to be set at once per machine cycle, once per every two machine cycles, or once per every four machine cycles. This is a factory option that is selected when the integrated circuit chip is being made and is not programmable thereafter. Timer register 56 thus maintains a continuous real time reference. An interrupt is generated each time timer register 56 overflows. This interrupt can be selectively masked by software. Timer register 56 is coupled to data bus 52 for reading and storing, to capture registers 54 and 55, to equality detector 57, and to status register 62 for signifying overflow. Timer register 56 may be read from or stored into by software via data bus 52 as with any other I/O register. Reading from register 56 has no effect on its counting sequence or the timing, however, storing into timer register 56 places a new eight-bit value into the register and incrementing of the timer is inhibited during the immediately following cycle only.

Compare register 58 is coupled to data bus 52 and to equality detector 57. Compare register 58 is an eight-bit register in which a preselected future time may be stored. This stored time is continuously compared for equality with timer register 56 and when the count in timer register 56 equals the number stored in compare register 58 a signal is generated which can cause an interrupt that is software maskable, or start SOUT output from command shift register 53. Both of these functions can be performed simultaneously or separately under conrol of bits in I/O control register 47. Compare register 58 can be read from or written into by software at any time. The predetermined time stored in compare register 58 is continuously compared for equality against timer 56 by equality detector 57. Equality detector 57 provides an output to status register 62.

I/O control register 47 is coupled to data bus 52 and provides an output to buffer driver 59 and to output driver 60. Control register 47 provides software control of command shift register 53 and output driver 59, provides software control of the operating mode of input/output RT3, and selectively masks the various interrupts. Control register 47 is an eight-bit register and may be read from or written into by software control via data bus 52. Bit seven, which is the most significant bit of control register 7, is the bit that masks the output generated by equality detector 57. Bit six masks timer overflow of timer register 56, bit five masks an RT1 transition interrupt, bit four masks an RT2 transition interrupt, bit three masks an RT3 interrupt and in conjunction with bit zero determines whether RT3 will be a high or a low when it is in the output mode. Bit two and bit one of control register 47 are used to control command shift register 53 and output driver 59. Control register 47 also receives an input from reset 43 which serves to clear control register 47 to "0's," which disables all interrupts and places RT3 in the input mode and SOUT in the static mode with a zero output. Control register 47 also provides an output to interrupt priority and control circuit 61.

Interrupt priority and control 61 establishes the priority of the interrupts controlled by control register 47 and provides an output to address bus 79. Interrupt priority and control 61 also provides an output to interrupt latch/mask 42, and in addition, is coupled to status register 62.

I/O status register 62 is an eight-bit register which can be read from or written into by software control and is coupled to data bus 52. Status register 62 is coupled to and receives inputs from inputs RT1, RT2, RT3, equality detector 57, and timer register 56. Status register 62 indicates the causes of interrupts and permits direct reading of the three real time input lines RT1, RT2, and RT3. The level appearing at input RT1 will be reflected by bit two of status register 62. If bit two is a logic level "0" it will indicate that the input at input RT1 is low, and if bit two is a logic level high it will indicate that the input at input RT1 is a high. In a corresponding manner, bit one of status register 62 reflects the input appearing at input RT2, and bit zero indicates the input at input RT3. Bits three through seven are set when an interrupt is detected by the input/output circuitry of processor 10. Bit three is set by a transition on input RT3, bit four is set by a transition on input RT2, bit five is set by a transition on input RT1, bit six is set when timer register 56 overflows, and bit seven is set when timer compare occurs as indicated by equality detector 57. If any one of the bits three through seven is a logic "1" and the corresponding bit in control register 47 is a logic "1," an interrupt will occur. Input RT3 can only cause an interrupt when it is in the input mode. It will be noted that the bits in status register 62 will be set to a logic "1" when the specified condition occurs regardless of the state of the interrupt enable bits in control register 47, however, interrupts will only be generated when the corresponding enable bit in register 47 is a logic one. The bit in status register 62 which causes the interrupt will be cleared to a logic "0" by the hardware when the interrupt is recognized. Also, the status bit or bits may also be cleared by software.

The timer overflow interrupt occurs at the end of the cycle during which the timer value increments from 255 to 0. The timer compare interrupt occurs at the end of the cycle following that in which the value in timer register 56 becomes equal to the value in compare register 58. Any interrupt will be delayed if another interrupt service routine is in process or if a multiple cycle instruction is being executed. Each interrupt condition has an associated memory location from which an interrupt vector address is fetched when that interrupt occurs. In the event that multiple interrupts occur, the interrupt occurring on the highest number bit of status register 62 takes priority, e.g., status bit seven takes priority over status bit six which takes priority over status bit five, etc. Once an interrupt has occurred other interrupt conditions may occur before the first one is cleared.

The last software instruction within each of the interrupt handling routines stored in foreground software is a return from interrupt RTI instruction. If no interrupts are active when the interrupt handling routine finishes servicing the last interrupt, the execution of the return from interrupt RTI instruction causes program control to be returned to the background memory program. If an interrupt condition still exists when the RTI is executed, another interrupt will occur immediately with the appropriate interrupt vector location being used because the effect of the RTI is the same as executing a jump-to-subroutine (JSR) instruction and a new vector address is provided for fetching the jump address to be executed by the JSR instruction. Bits three through seven of status register 62 may be written by software thereby causing an interrupt if the interrupt is enabled by the associated bit in control register 47. Bits zero through two of status register 62 cannot be written by software. Only ten bits are fetched from memory for an interrupt vector when an interrupt occurs. The three high order bits AD10 through AD12 are hardware generated.

When an interrupt occurs during a first machine cycle, the data processor finishes execution of the instruction then being executed. Rather than storing the instruction fetched from memory during this first machine cycle, instruction decode and control block 11 forces an op code for a jump-to-subroutine instruction onto line 22 to be stored by instruction register 24. The program counter increment operation is disabled during this first machine cycle. Address bus 79 is driven from interrupt priority and control block 61 rather than program counter 76 to supply the location of the jump address for the recognized interrupt, and the jump address is fetched on the second machine cycle. During this second machine cycle, instruction decode and control block 11 forces line 14 to the address of the ninth eleven-bit stack register for saving the contents of M register 73 and ME register 74. Also during this second machine cycle, the output of program counter 76 is input to incrementor 77, the increment operation is disabled, and the output of the incrementor is stored in T register 78. Simultaneously, the jump address fetched during this second machine cycle is received from memory, on memory bus MB, and is transferred by buffer 85 and line 86 to the input of program counter 76. Finally, during the third machine cycle, the instruction stored at the jump address is fetched from memory while the prior program counter value, now stored in T register 78, is transferred to the program counter stack.

K register 64 is an eight-bit register coupled to data bus 52 and provides an output to selector 16. Register 64 is a directly addressable register and is also used to hold the effective register address for the indirect register addressing mode. K register 64 is coupled to KS register 63. Register 63 is also an eight-bit register and serves as a single-level stack for register 64. Whenever a program interrupt occurs the contents of register 64 are saved in stack register 63. Upon execution of the return from interrupt, RTI, instruction the contents that were being saved in stack register 63 are transferred back to K register 64.

The A register 67 is an eight-bit register which is coupled to data bus 52 to receive data from bus 52. The A register 67 is also coupled to arithmetic and logic unit 13 and provides true and complement outputs thereto. Register 67 holds one of the operands for two-operand operations while the other operand is read from an addressable register. In most instructions, the result of the operation is returned to the addressed register in register array 48. A group of single-operand instructions operates on register 67 alone. Register 67 holds the most significant half of a sixteen-bit operand for divide and shift double instructions and holds the most significant half of a sixteen bit result from a multiply operation. A register 67 is not one of the addresssable registers, and its use is implicit in various instructions. Register 67 is coupled to a single-level stack register 66. When an interrupt occurs the contents of register 67 are transferred to stack register 66 where they are saved. At the completion of the return from interrupt, RTI, instruction the contents of stack register 66 are transferred back into register 67.

Arithmetic and logic unit 13 is coupled to data bus 52 and provides outputs to shift network 69 and to flag register 71. Zero and carry bits are provided by arithmetic and logic unit 13 to flag register 71 for signifying whether the result of the operation performed by unit 13 was equal to zero or generated a carry-out, respectively. Data from bus 52 can be directly coupled to arithmetic and logic unit 13 or its complement can be selected by the instruction word before the data is input to unit 13. Inverter 68 is used to obtain the complement of the data on data bus 52. The arithmetic and logic unit 13 performs the operations of add, subtract, increment, decrement, AND, OR, and exclusive OR on data contained in register 67 and/or any of the addressable registers. The eight-bit result of the operation can optionally be shifted one place left or right by shift network 69. Multiply and divide operations are accomplished by multiple passes through arithmetic and logic unit 13. Shift network 69 is coupled to data bus 52 and cooperates with the arithmetic and logic unit 13 to perform the shift functions.

Flag register 71 is an eight-bit register which is coupled to data buses 51 and 52. In addition to the eight bits from register 71 which are coupled to data bus 52, two of the bits are also coupled to data bus 51. These two bits are the zero and carry bits. As stated hereinbefore the zero and carry bits are coupled from arithmetic and logic unit 13 to flag register 71. Register 71 can be read from or written to by software control via data bus 52. Register 71 contains indicator flags which are set or cleared according to the results of most arithmetic and logical operations; in addition, software controlled and testable flags are included. The flag bits in register 71 can be tested as jump conditions by the conditional branch instructions. Flag register 71 is coupled to a single-level flag stack register 72. Stack register 72 is also an eight-bit register and when an interrupt occurs it stores the contents of register 71. At the end of the interrupt, when the RTI instruction is being executed, the contents from stack register 72 are transferred back into register 71.

M register 73 is an eight-bit register and is coupled to data bus 52 and to address bus 79. Register 73 can be read from or written into under software control and is also used uniquely in multiply, divide, shift right double, shift left double, read memory, write memory, jump through M register, and jump to subroutine through M register instructions. In multiply, divide, and shift double instructions, register 73 forms a least significant half of a sixteen-bit operand or result. In read memory and write memory instructions register 73 contains the least significant eight-bits of the memory address, the most significant three bits being contained in M Extension (ME) register 74. In jump through M and jump to subroutine through M, register 73 contains the least significant eight-bits of the jump address, the most significant three-bits of the jump address being contained in ME register 74. ME register 74 is a three-bit register and is coupled to data buses 51 and 52 and to address bus 79. Register 74 holds bits eight, nine, and ten of the memory address for read memory, write memory, jump through M register, and jump to subroutine through M register instructions. As previously mentioned, M register 73 and ME register 74 both share an eleven bit interrupt backup or stack register which is part of register array 48; this eleven bit register is where the contents of registers 73 and 74 are stored during an interrupt routine. During execution of the return from interrupt instruction, the contents saved in the stack register are returned to registers 73 and 74.

Program counter register 76 is an eleven-bit register which is coupled to data buses 51 and 52 and to address bus 79. Register 76 is a program counter and keeps track of the address being accessed and is incremented by one as each instruction word is accessed thus causing instructions to be executed sequentially from program memory. Register 76 can be loaded via the jump and branch instructions to alter this sequential operation. Incrementor 77 is coupled to program counter register 76 and increments register 76. Register 76 receives ten inputs which are coupled by line 86 from buffer 85 plus one input which comes from instruction register 24.

Eight eleven-bit registers are provided in register array 48 for saving and restoring the contents of program counter register 76 during subroutines and interrupts. The eight eleven-bit registers form an eight level push down stack and these eight eleven-bit stack registers are not directly program addressable. A three-bit stack pointer 46 keeps track of which of the eight eleven-bit stack registers is being accessed. When a jump to subroutine is executed or a program interrupt occurs, stack pointer 46 is decremented by one and the contents of program counter register 76 are transferred to the stack register indicated by stack pointer 46. Thus, stack pointer 46 normally points to the last address which was stored. The address stored is the address to which the program will return once the subroutine or the interrupt routine has been completed. Return from subroutine and return from interrupt instructions cause program counter register 76 to be reloaded from the stack register indicated by stack pointer 46 and then stack pointer 46 is incremented by one except when another interrupt is pending during execution of RTI, in which case, stack pointer 46 is not incremented by one and register 76 is loaded with the contents of the vector address instead of the contents of the stack register. Incrementing or decrementing stack pointer 46 will cause it to wrap around after eight locations have been used, thus the stack may be considered to be circular and storing more than eight addresses in this stack will cause the oldest address to be destroyed and only the most recent eight addresses will be retained. Stack pointer 46 cannot be directly read or written into by software control. Of the eight available levels, one may be an interrupt return address if interrupts are used, with the rest being available for subroutine nesting.

Temporary register 78 is also an eleven-bit register and is used only to temporarily store information. Register 78 is clocked during each machine cycle and receives ten input bits from line 86 and one input bit from instruction register 24. Outputs from register 78 are coupled to data buses 51 and 52. The output of incrementor 77 may also be loaded into temporary register 78. This feature allows the contents of program counter register 76 to be incremented and stored in T register 78 during a first cycle, while program counter 76 is loaded with a jump address and the contents of T register 78 are transferred to the program counter stack during a second cycle.

Address bus 79 is an eleven-bit bus and is selectively coupled to external memory bus MB by selector 81 and output buffer 87. One of the bits from address bus 79 is coupled to buffer 88 which provides an output for output AD10. This one bit is taken from the high order bit of eleven-bit program counter 76 or from the high order bit of ME register 74. Selector 81 selects either address bus 79 or data buses 51 and 52 to be coupled to memory bus MB. Three bit data bus 51 cooperates with eight bit data bus 52 to provide a data bus capable of handling eleven bits of data. Selector 81 is connected to buffer 87 and to read-only-memory 83, when read-only-memory 83 exists as a part of data processor 10. Memory bus MB carries the low order ten bits of the memory address during the first half of the clock cycle and ten data bits during the second half of the clock cycle. The ten memory bus lines MB are tristate bidirectional lines.

In order to describe the page limitations of processor 10 it is helpful to define three terms. The first term is "foreground software" and is that portion of the program that is executed in response to the various interrupts, e.g., all the instructions executed following an interrupt until and including the return from interrupt, RTI, instruction. The second term is "background software" which is a portion of the program that is executed in the absence of the interrupts or between interrupt routines. The third term is "data tables" which are the data words accessed from memory by the read memory instruction and this address space would also include any writable memory or peripheral device attached to memory bus MB and accessed by the read memory or write memory instructions.

Two pages are available for background software. One page is available for foreground software only, and another page can be shared by foreground software and data tables. The page bit is controlled by software using the jump page instruction and is used to provide background or foreground program expansion from 2048 words of memory to 4096 words of memory. In systems of 4 K or 6 K memory, it may be necessary to use a page bit in order to pack the entire program into the available memory space even though neither foreground nor background exceeds 2048 words. The page bit stored in page flip-flop 28 is initialized to zero by RESET. The jump page instruction inverts the page bit thus changing pages. Page changing within the foreground or background software can only be accomplished with the jump page instruction.

If an interrupt occurs, the background page bit is saved by a single-level page stack 29 and page flip-flop 28 is then initialized to zero for the foreground and can be changed as required. The return from interrupt instruction restores the background page saved by page stack 29 back into page flip-flop 28. Outputs AD11 and AD12 select the page and as noted hereinbefore AD11 is controlled by hardware and AD12 is controlled by the page bit from page latch 28. However, during the data transfer cycle of read memory or write memory instructions, when addressing memory with M and ME registers 73 and 74, the hardware forces both AD11 and AD12 to be logic "1's." Therefore, all data must lie in page three and can be accessed regardless of which page the software is currently executing in. Digital data processing systems that require less than 8 K memory may fold pages together by using partial decoding of the page address bits to achieve memory sizes of 2 K, 4 K, or 6 K.

By now it should be appreciated that there has been provided a basic architecture for a digital data processor useful in general purpose processors yet aimed at a specific controller application. Data processor 10, as illustrated, can operate in conjunction with an interface circuit for a specific application such as an automobile engine control including such tasks as measuring of engine, vehicle, and environmental conditions and generation of spark timing signals along with cntrol of exhaust gas recirculation valve position and fuel metering control. Four input/output signals (SOUT, RT1, RT2, and RT3) and a timing signal CLK are provided for communication between processor 10 and a linear interface circuit. Processor 10 performs its controlling functions in response to these signals through seven special purpose I/O registers (registers 47, 53 through 56, 58 and 62). The seven registers are operated on by the instruction set in the same manner as the other registers without the benefit of any explicit I/O instructions. The first thirty-one registers in register array 48 are directly and indirectly addressable by all register manipulation instructions and may be used for arithmetic and logical operations. The seven input/output registers are included in this group of thirty-one registers. Registers 32 and above in register array 48 are directly addressable by load A and store A instructions and indirectly by all other register manipulation instructions. Thus these registers are not as readily accessible as the first thirty-one registers and should be used where possible for data which is less often accessed. There is also provided a one level stack for storing the contents of registers 64, 67, 71, 73, and 74. The contents of these registers are stored directly concurrently with saving the contents of program counter register 76 during a program interrupt. Upon the completion of the return from interrupt instruction these register contents are transferred back into the registers concurrently with restoring program counter register 76. This technique provides very fast response to interrupts and greatly reduces overhead time associated with interrupt handling. The stack registers used for storing the contents of these registers are not addressable by software.

Figures 2, 3:
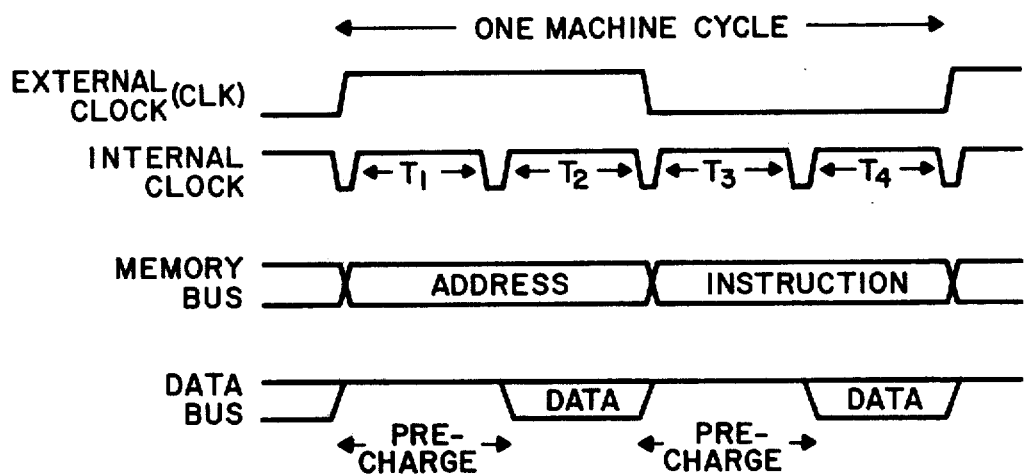
FIG. 2 is a timing diagram setting forth the relationship between a master external clock and various internal clocks.
FIG. 3 illustrates the arrangement of FIGS. 3A through 3U.

In FIG. 2 a timing diagram is shown which includes the external clock signal CLK and a series of internal clock signals, $T_1$, $T_2$, $T_3$, and $T_4$. The external clock signal CLK is generated by clock generator 36 and is an output from buffer 38 as shown in FIG. 1. Internal clock signals $T_1$ through $T_4$ are provided by clock generator 36, and are shown in FIG. 1 as being coupled by line 33 to instruction decode and control block 11. Also shown in the timing diagram in FIG. 2 are waveforms denoting the status of memory bus, MB, and data bus, 51 and 52, during one machine cycle. For a typical instruction fetch, CLK is high during the first half of a machine cycle, and the address of the memory location to be accessed is driven onto the memory bus, MB, by buffer 87. During the second half of the machine cycle, CLK is low and the external read only memory drives the accessed instruction onto the memory bus, MB, which is received by input buffer 85.

During a first clock phase $T_1$, the internal data bus, 51 and 52, is precharged prior to transferring data from register array 48 to arithmetic unit 13. Also during clock phase $T_1$, the program counter 76 is coupled to the incrementer 77. During internal clock phase $T_2$ for a typical instruction, the data stored in register array 48 corresponding to the location selected by selector 16 is driven onto the data bus for processing by arithmetic and logic unit 13. During the internal clock phase $T_3$, the data bus is again precharged to prepare for a second transfer of data. Also during internal clock cycle $T_3$, arithmetic and logic unit 13 executes the instruction decoded by instruction decode and control block 11. Finally, during the internal clock phase $T_4$, the result from the operation performed by arithmetic and logic unit 13 is coupled to data bus 52 by shift logic 69 and is transferred to register array 48 to be stored in the location selected by selector 16. Also, during clock phase $T_4$, the program counter 76 is loaded from incrementer 77 with the address of the instruction to be fetched on the next machine cycle.

Referring again to FIG. 1, address bus 79 is precharged durig clock phase $T_3$. The contents of program counter 76 are updated with the incremented value during clock phase $T_4$. On the trailing edge of $T_4$ the output of the program counter 76 is coupled to address bus 79 to supply the address of the next instruction. Output buffer 87 is enabled during clock phases $T_1$ and $T_2$ in order to couple address bus 79 to memory bus MB. During clock phase $T_3$, while the address bus 79 is being precharged, the data bus, 51 and 52, is coupled by selector 81 to the input of buffer 87. For a write-memory instruction, output buffer 87 is enabled during clock phases $T_3$ and $T_4$ in order to transmit the data on the data bus onto memory bus MB so that the data may be written in memory. During the execution of all but the write-memory instruction, the data bus 51 and 52 is precharged during clock phase $T_1$ and also during clock phase $T_3$. However, during a write-memory instruction, the data bus is not precharged during clock phase $T_3$ so as to avoid interfering with the transmission of data to the memory bus MB.

Instruction register 24, program counter 76, and the T register 78 are all updated during clock phase $T_4$. Typically, the program counter is loaded with the output of incrementor 77. However, during jump instructions, the program counter is loaded with the 10 bits of data received by input buffer 85 from memory bus MB plus an 11th bit received from instruction register 24. Typically, T register 78 is updated with the 10 bits of data received by memory bus MB and an 11th bit originating in instruction register 24. However, when a subroutine or an interrupt occurs, T register 78 is updated with the output of incrementor 77 to allow for storage of the return address on the program counter stack.

The data bus is coupled to the input of the arithmetic and logic unit 13 during clock phase $T_2$. The output of shift network 69 is typically coupled to the data bus from the trailing edge of clock phase $T_3$ until the leading edge of clock phase $T_1$. For a write-memory instruction, however, it will be recalled that the data bus is not precharged during clock phase $T_3$; therefore, during a write-memory instruction, the output of shift network 69 is coupled to the data bus 52 from the trailing edge of clock phase $T_2$ until the leading edge of clock phase $T_1$. During the execution of most instructions, register array 48 is written during clock phase $T_4$ to store the data present on the data bus. However, during the excecution of a jump to subroutine instruction, the register array is capable of writing data during clock phase $T_2$ in order to store the return address on the program counter stack.

Although instruction register 24 is loaded, during clock phase $T_4$, with the instruction to be executed on the following clock cycle, the latching of the new instruction does not interfere with the execution of the present invention. During clock phase $T_4$, the outputs of instruction register 24 are disabled by gating circuitry, and the instruction decoder lines within instruction decode and control block 11 are precharged. Control signals which have been decoded for the instruction presently being executed are latched during either clock phase $T_2$ or $T_3$ for use during clock phase $T_4$. The outputs of the appropriate latches are then gated with clock phase $T_4$ such that these control signals occur at the proper time. Latching the appropriate decoded signals prior to clock phase $T_4$ allows the circuitry to prepare for decoding the next instruction without interfering with the execution of the present invention.

Figure 3A:
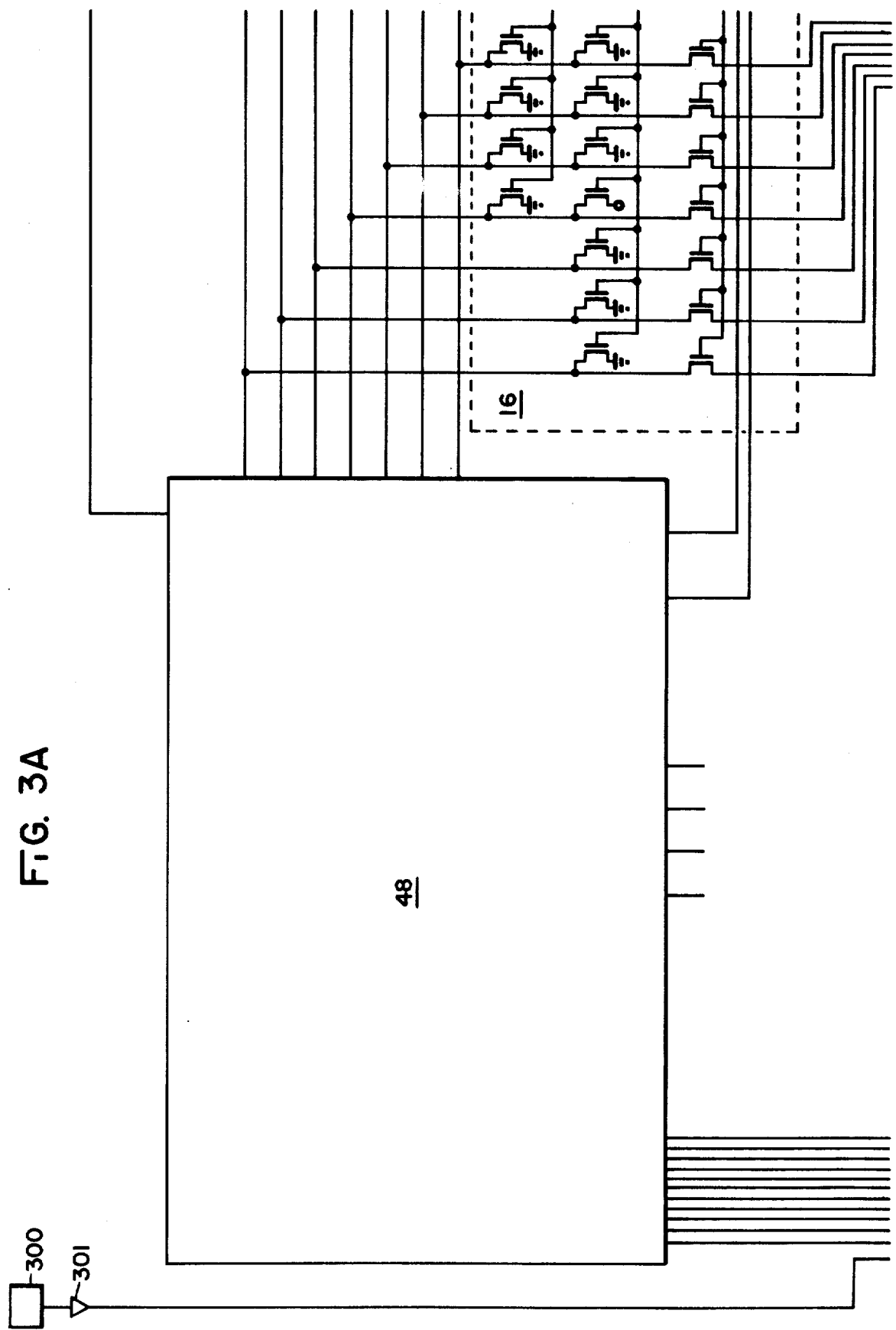
FIGS. 3A through 3U show in logic diagram form a preferred embodiment of the microprocessor shown in FIG. 1.
Figure 3B:
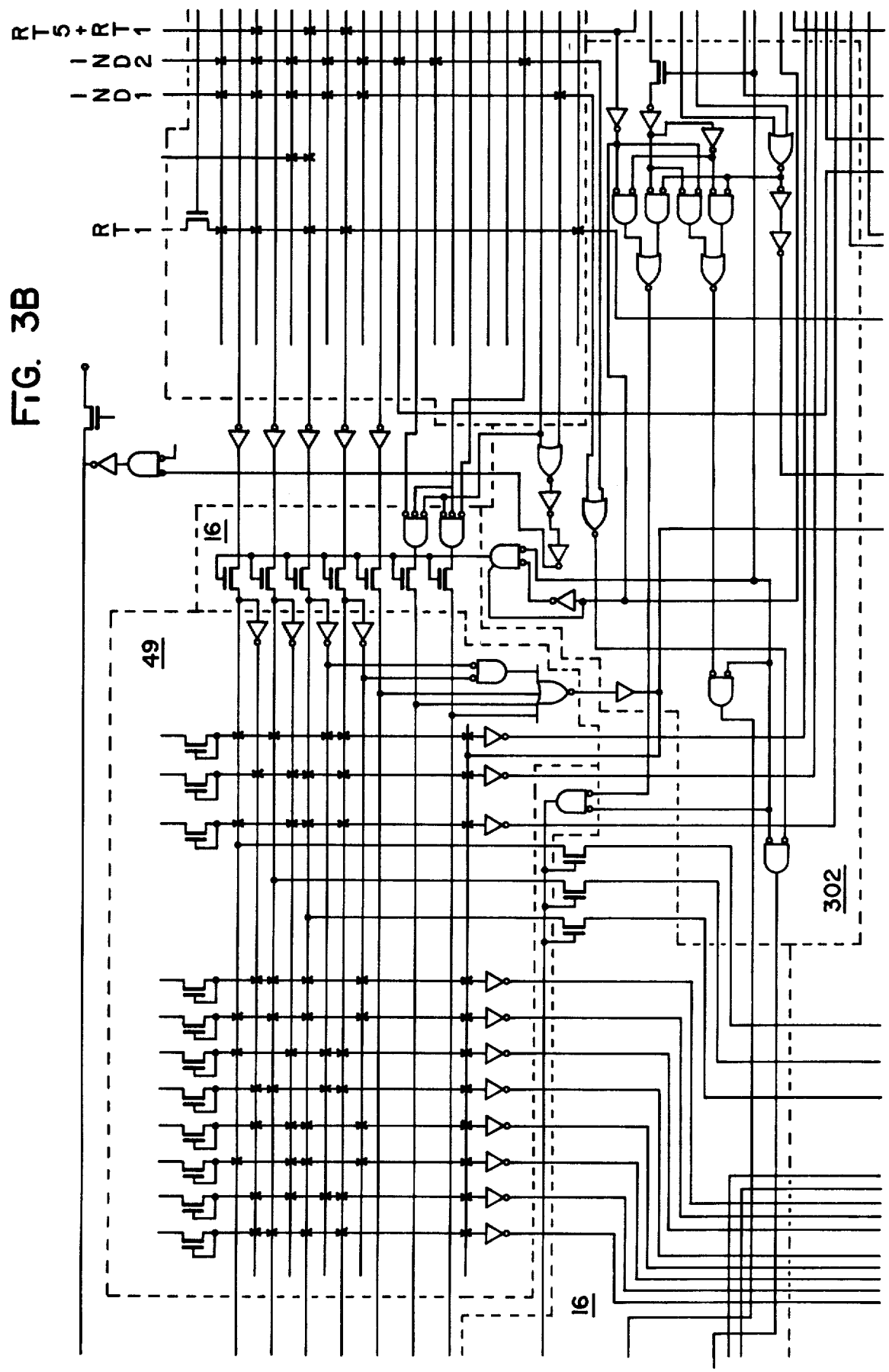
Figure 3D:
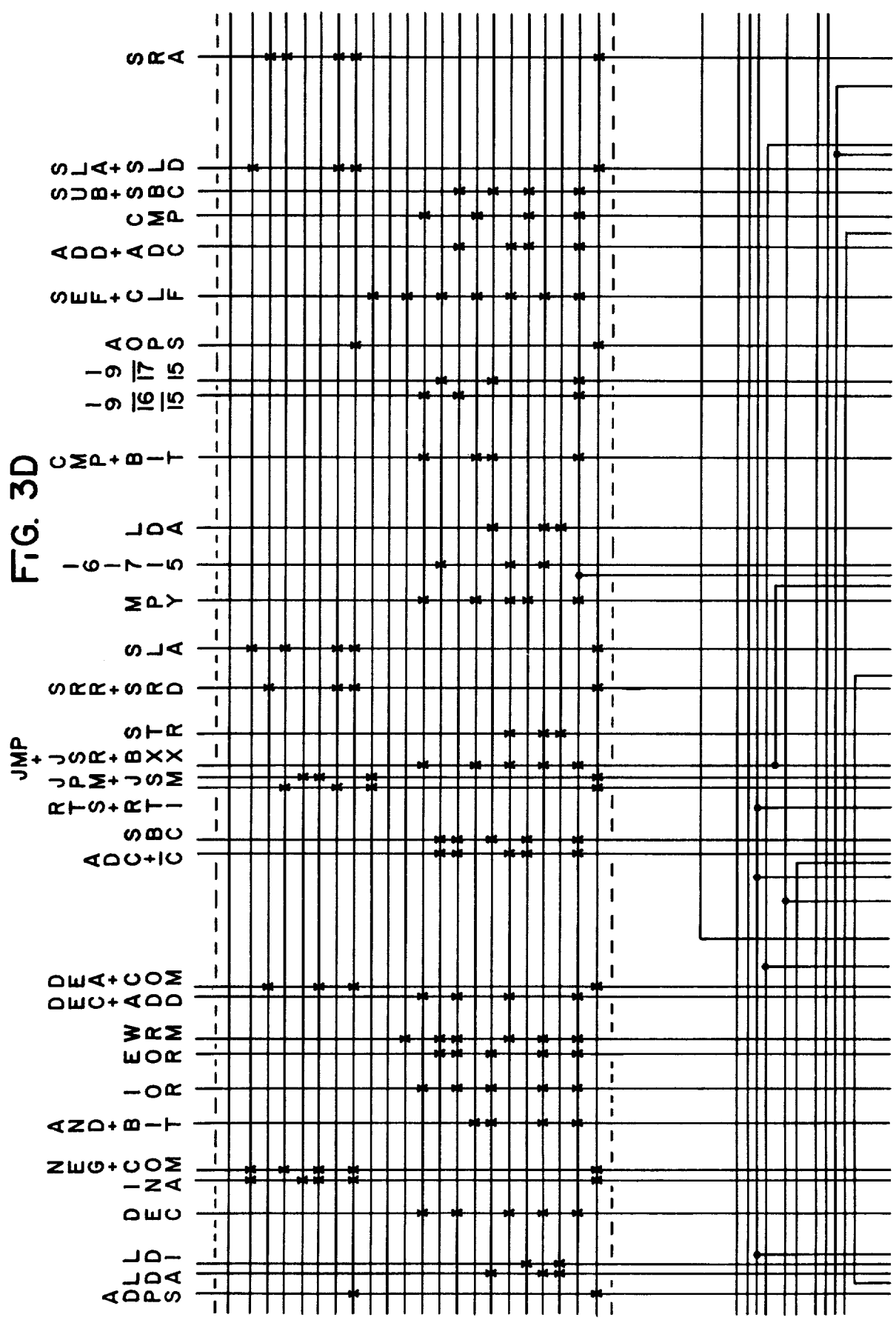
Figure 3F:
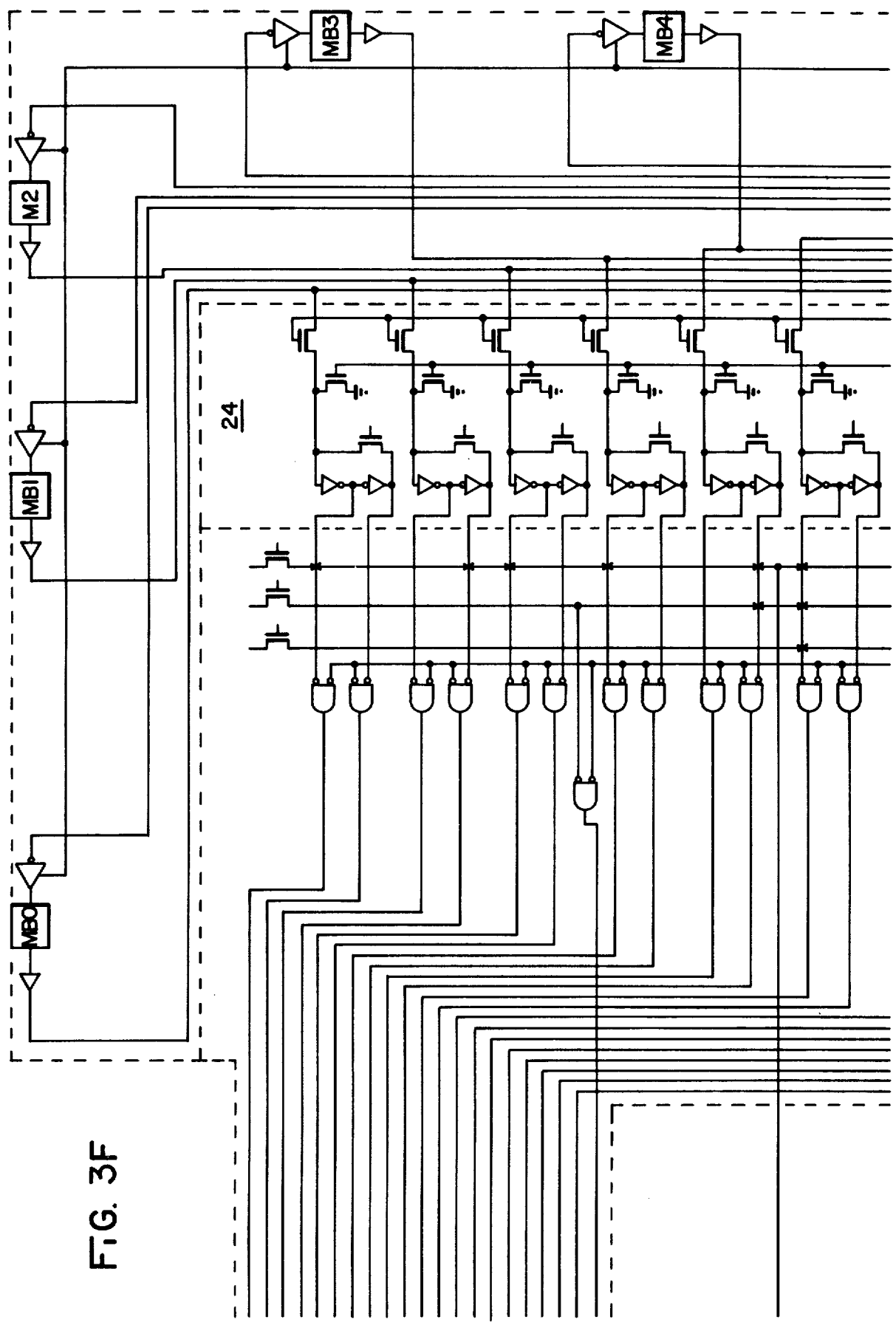
Figure 3H:
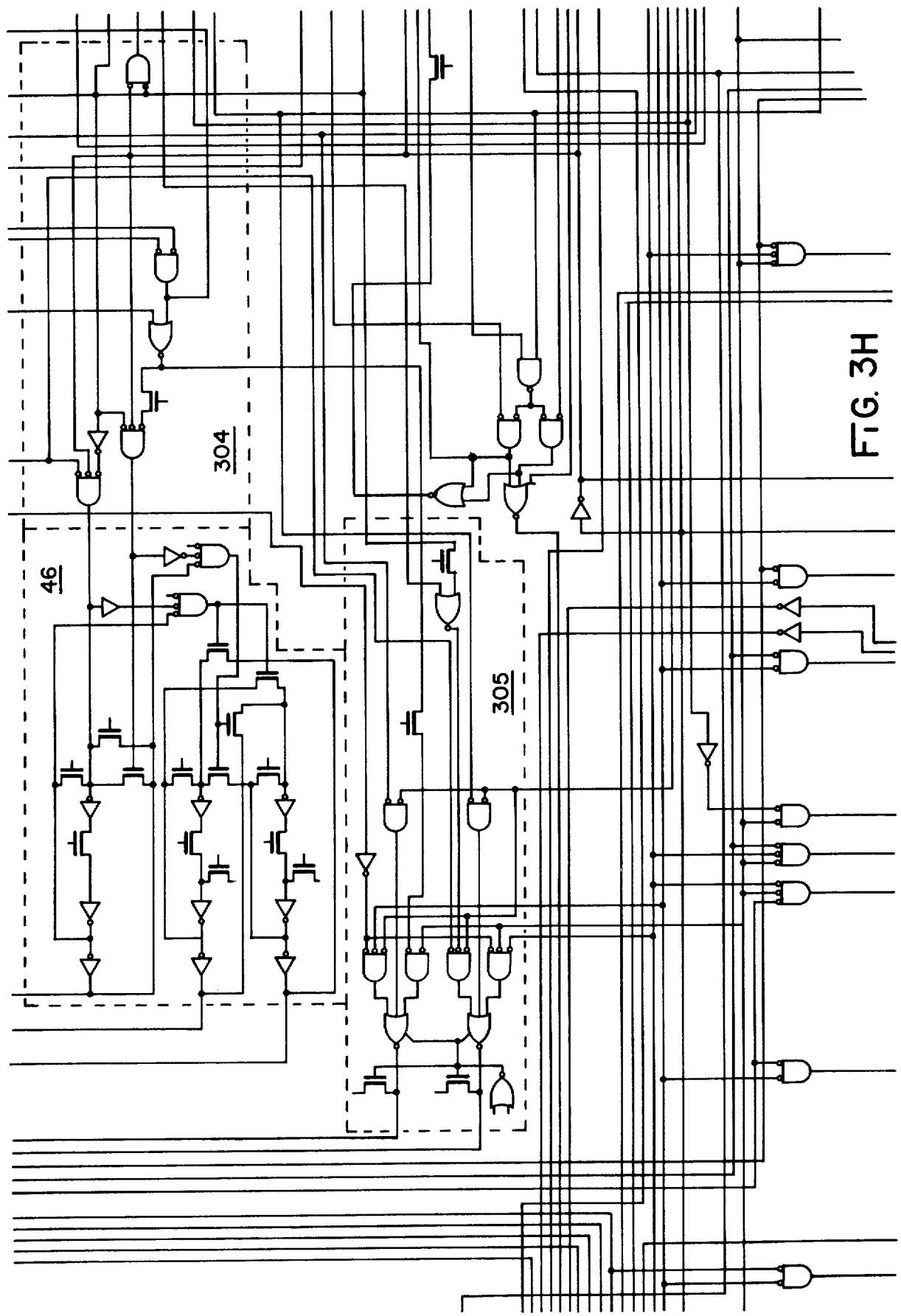
Figure 3I:
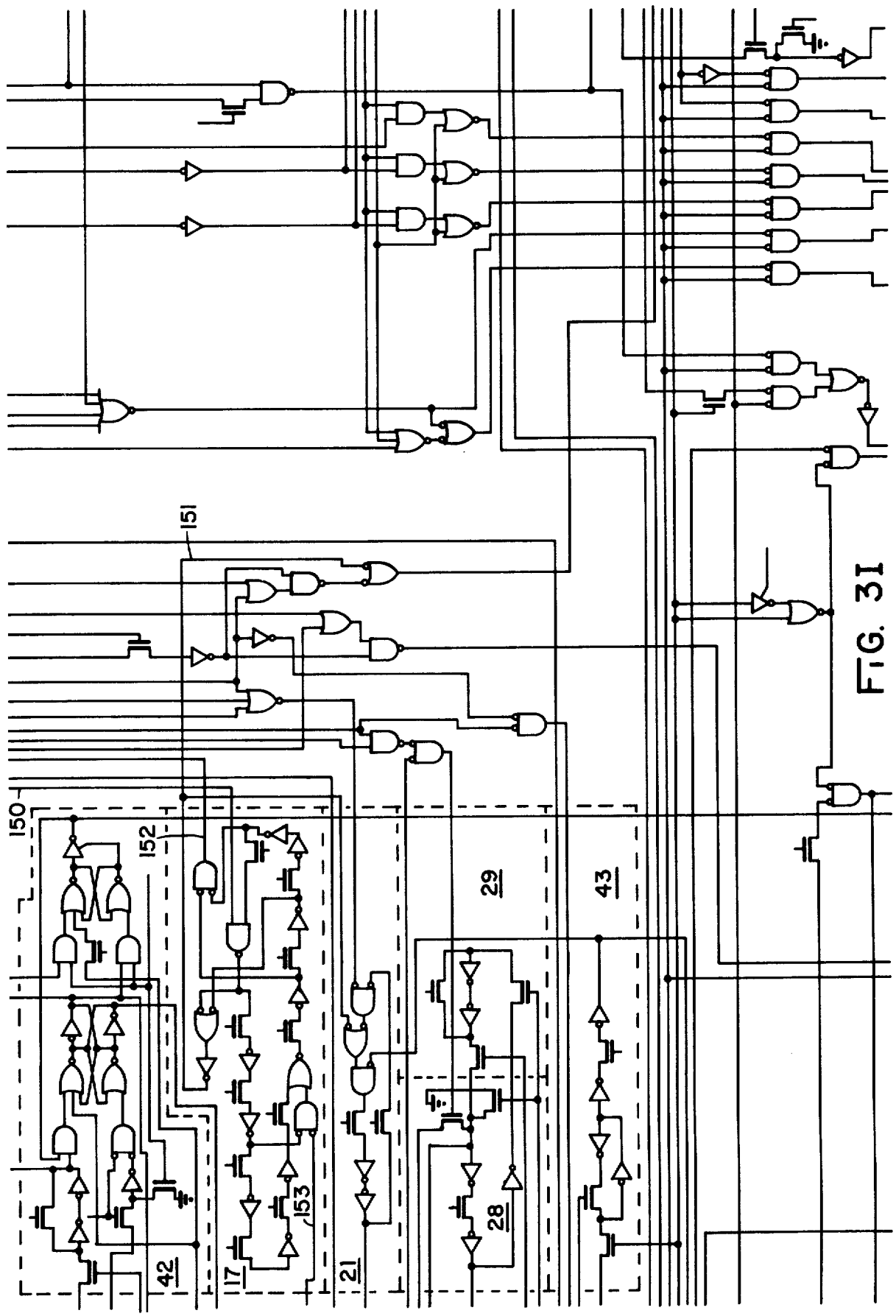
Figure 3J:
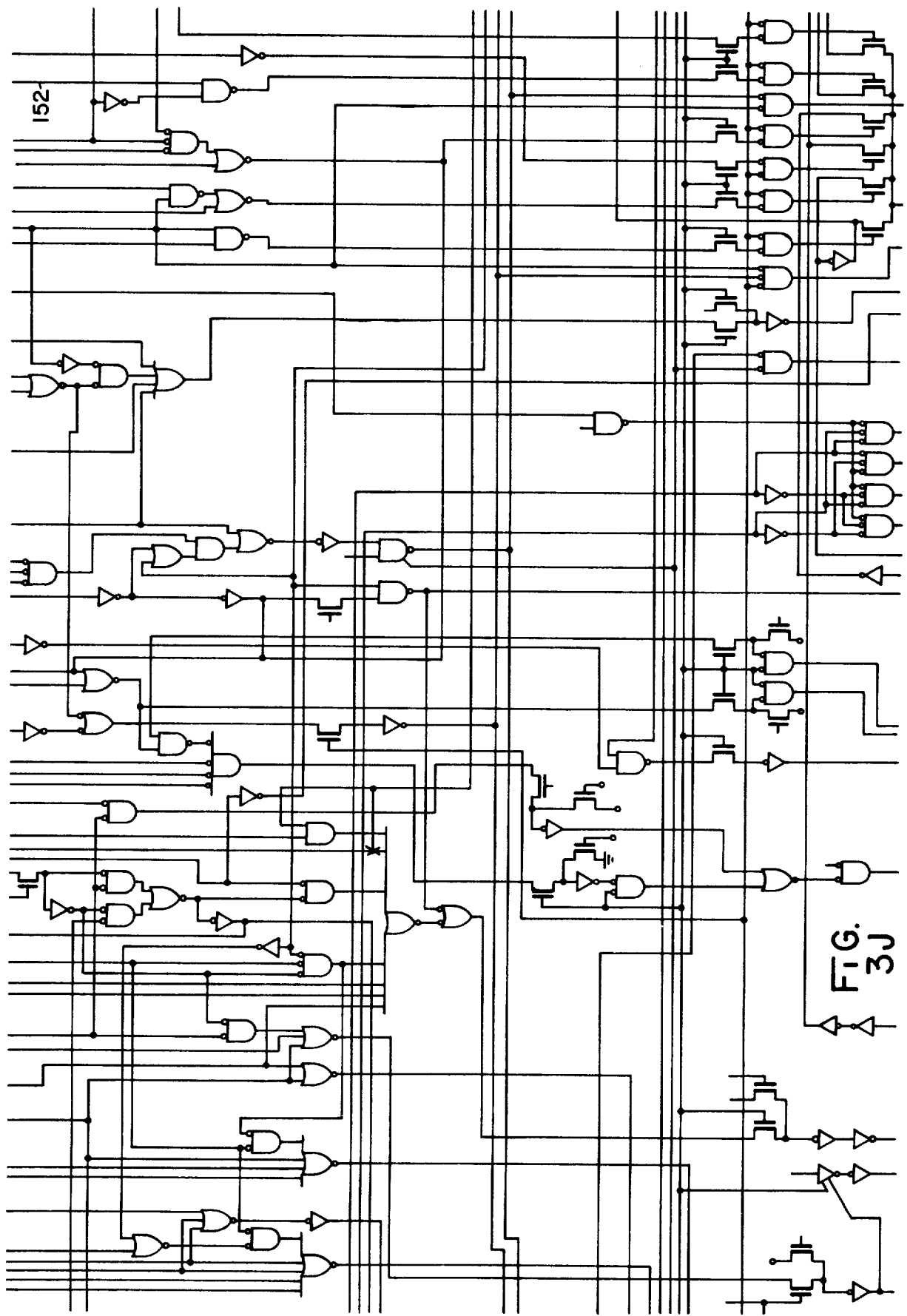
Figure 3K:
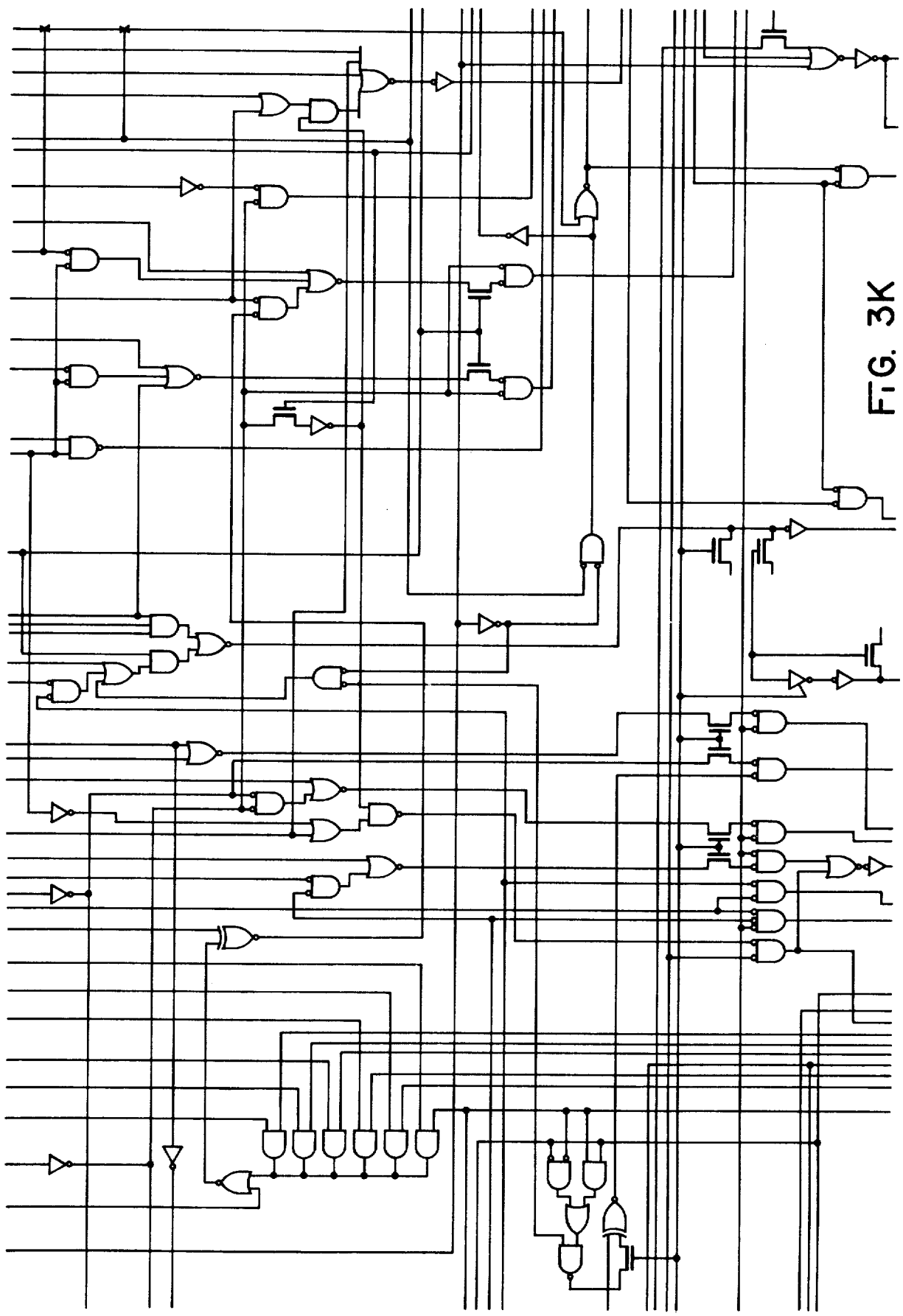
Figure 3L:
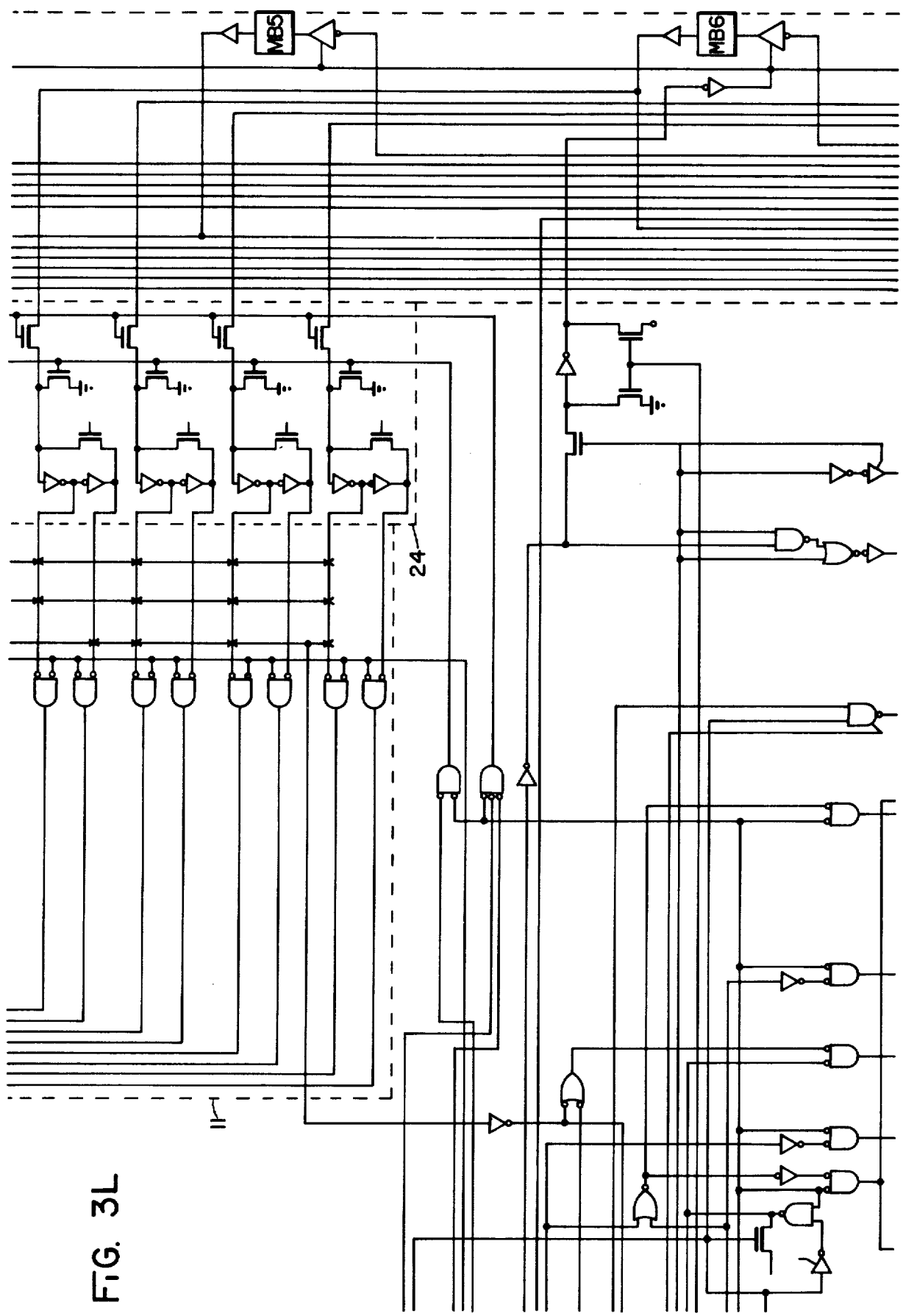
Figure 3M:
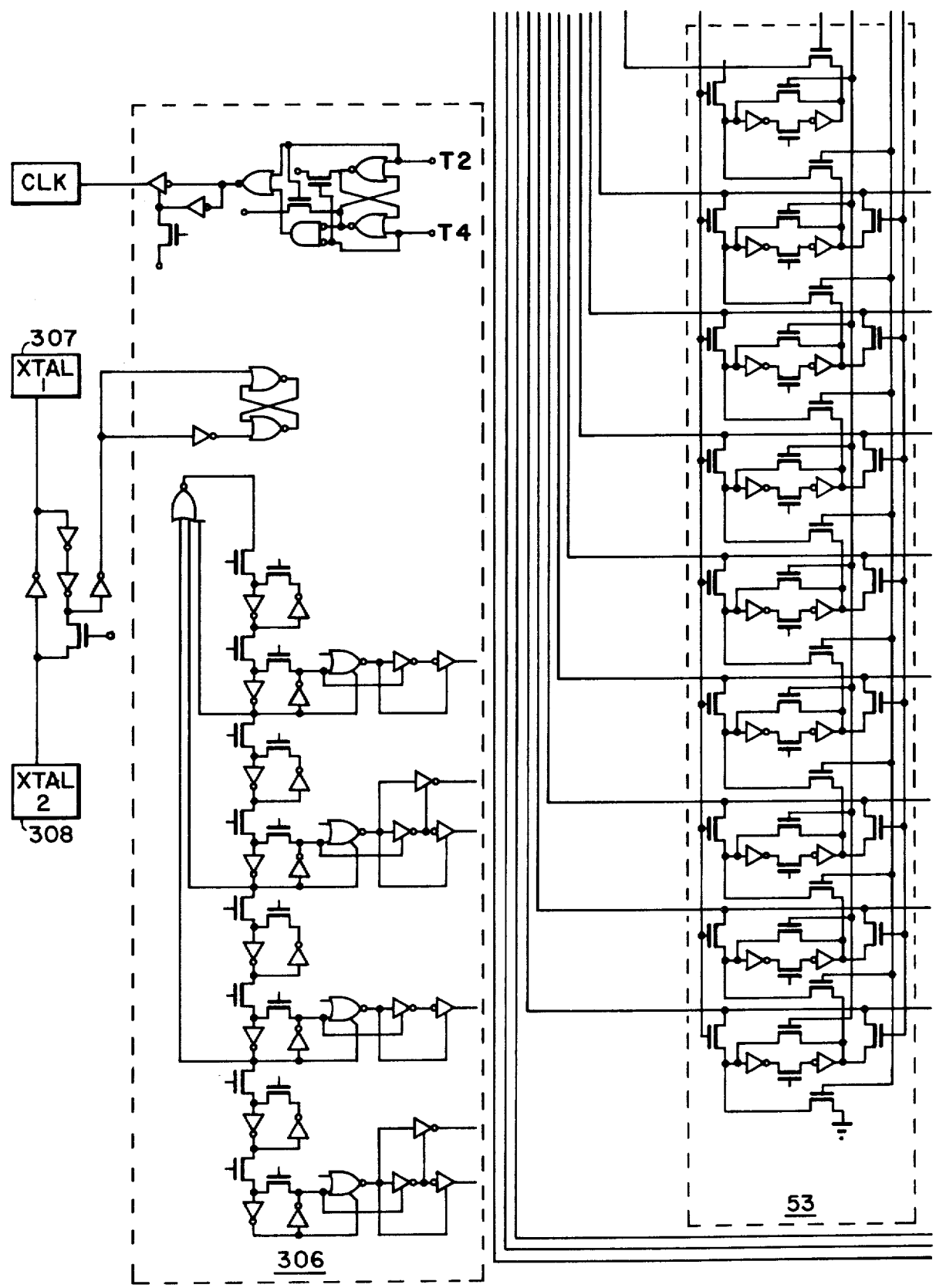
Figure 3N:
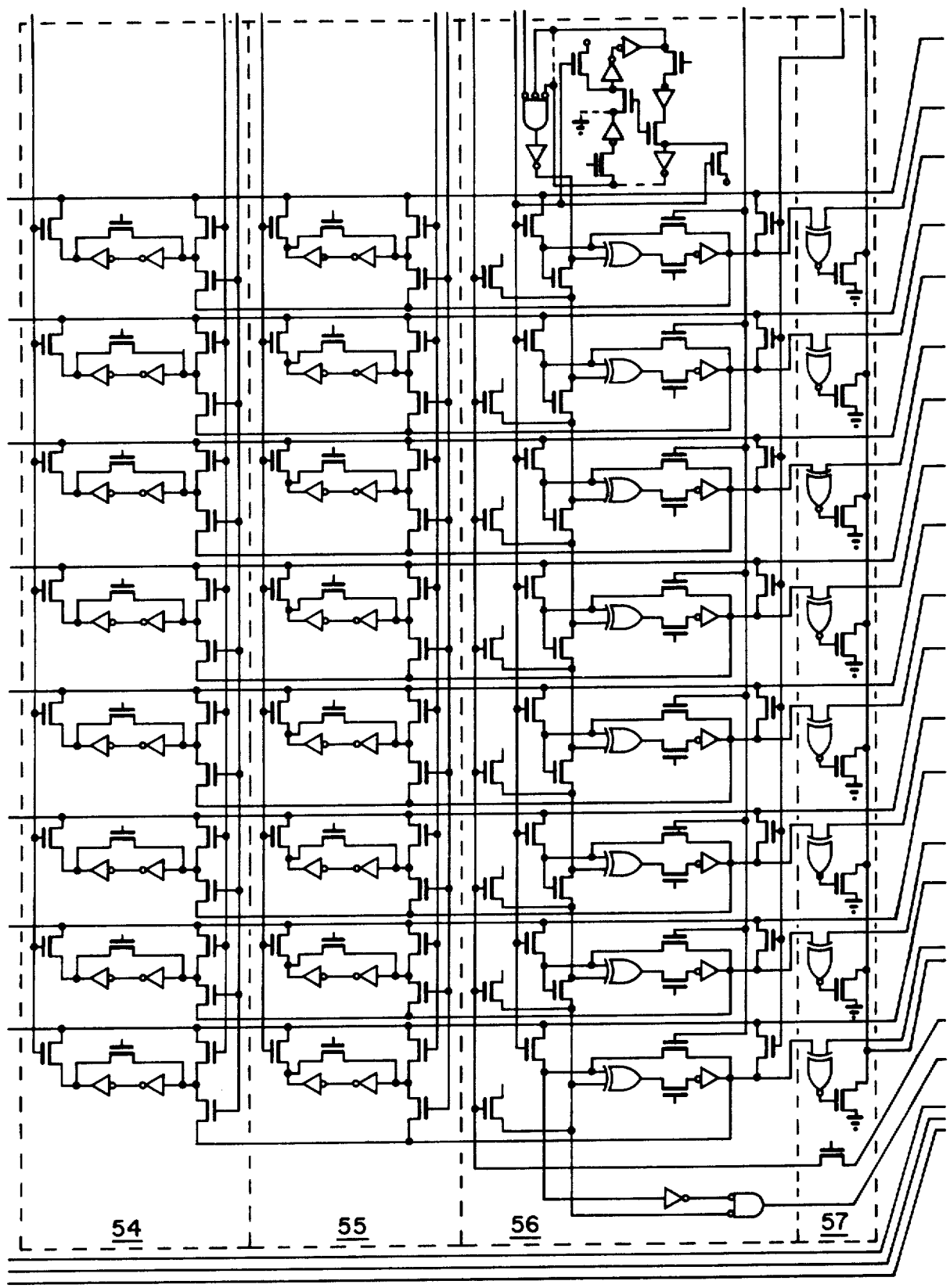
Figure 3P:
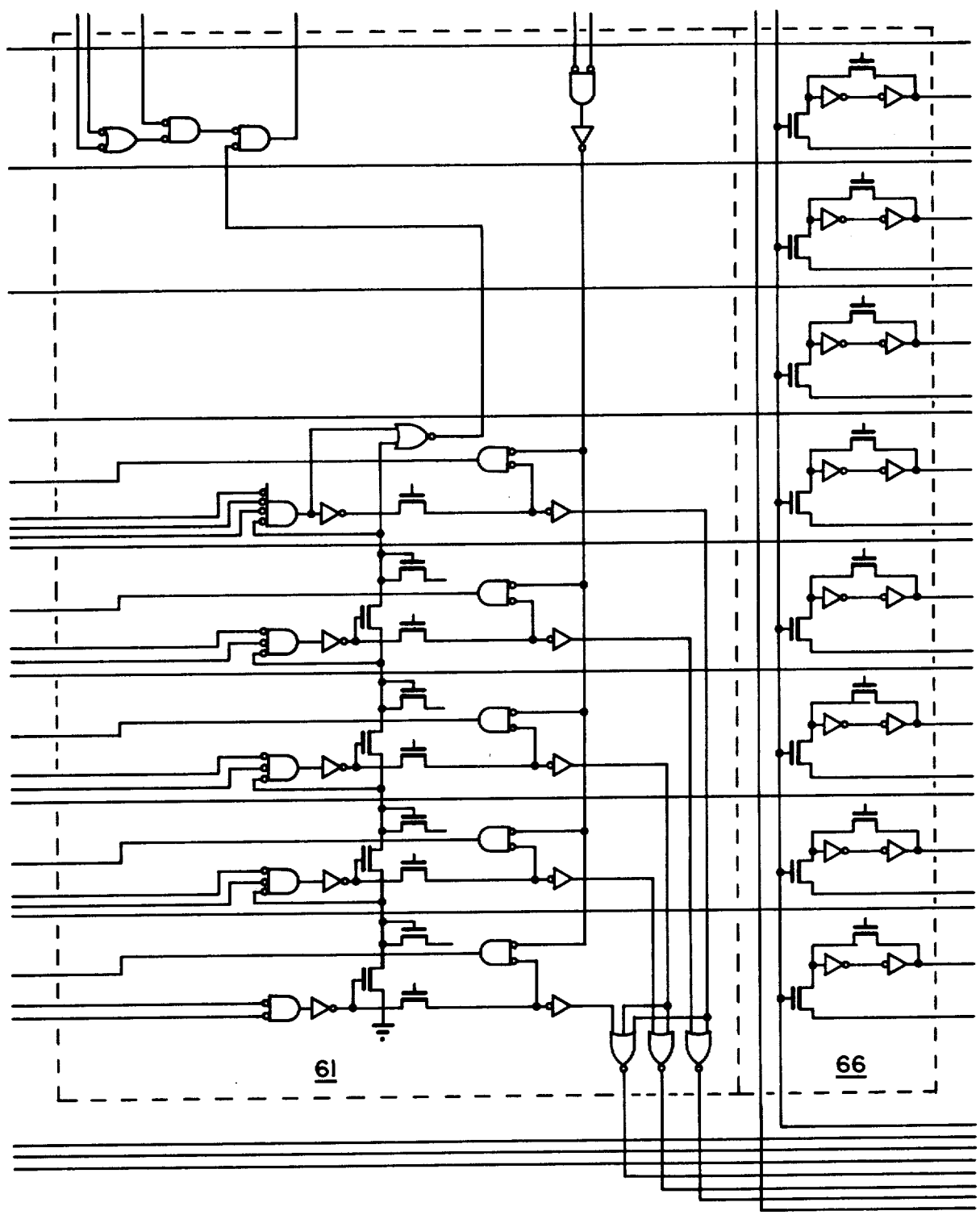
Figure 3Q:
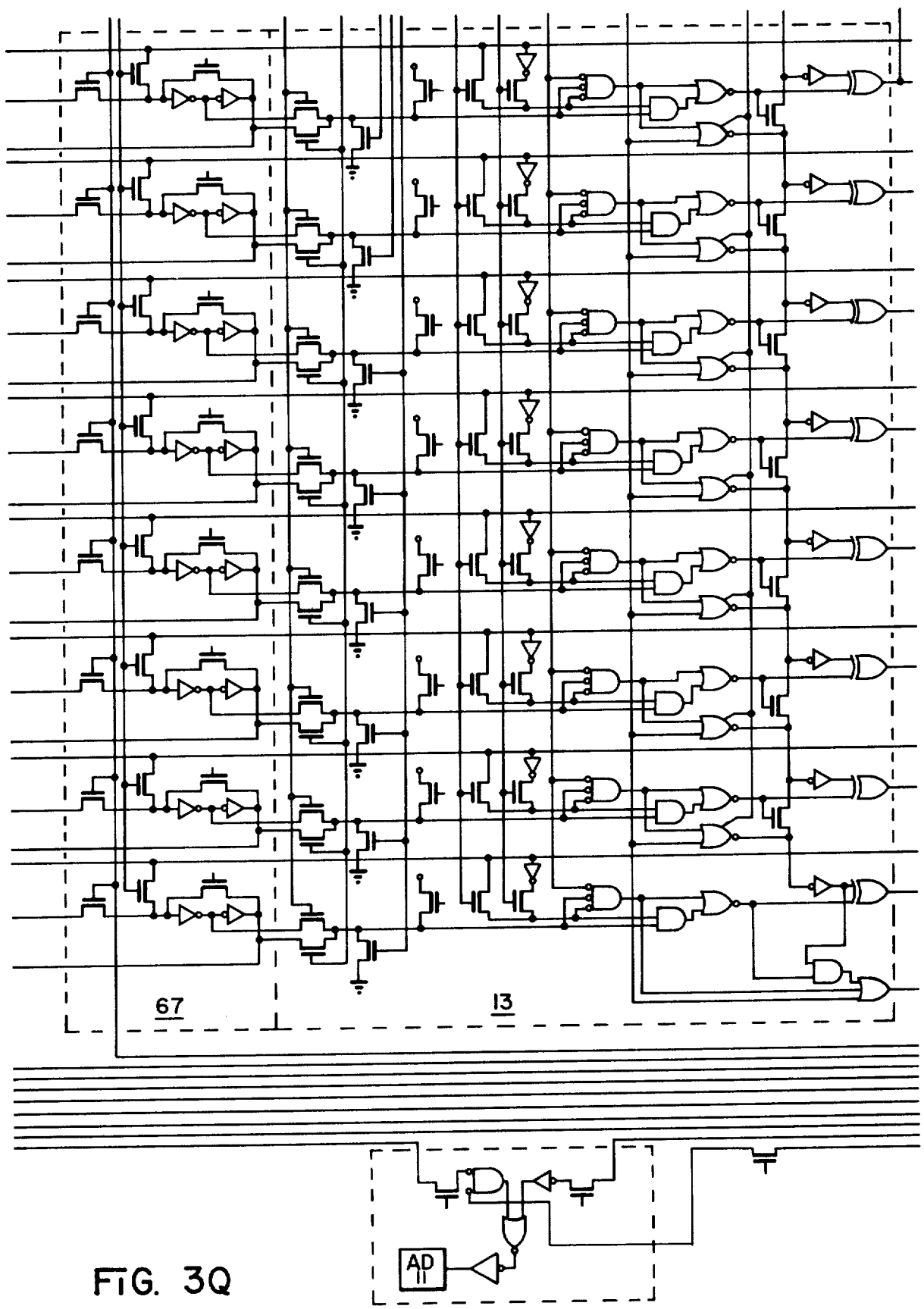
Figure 3R:
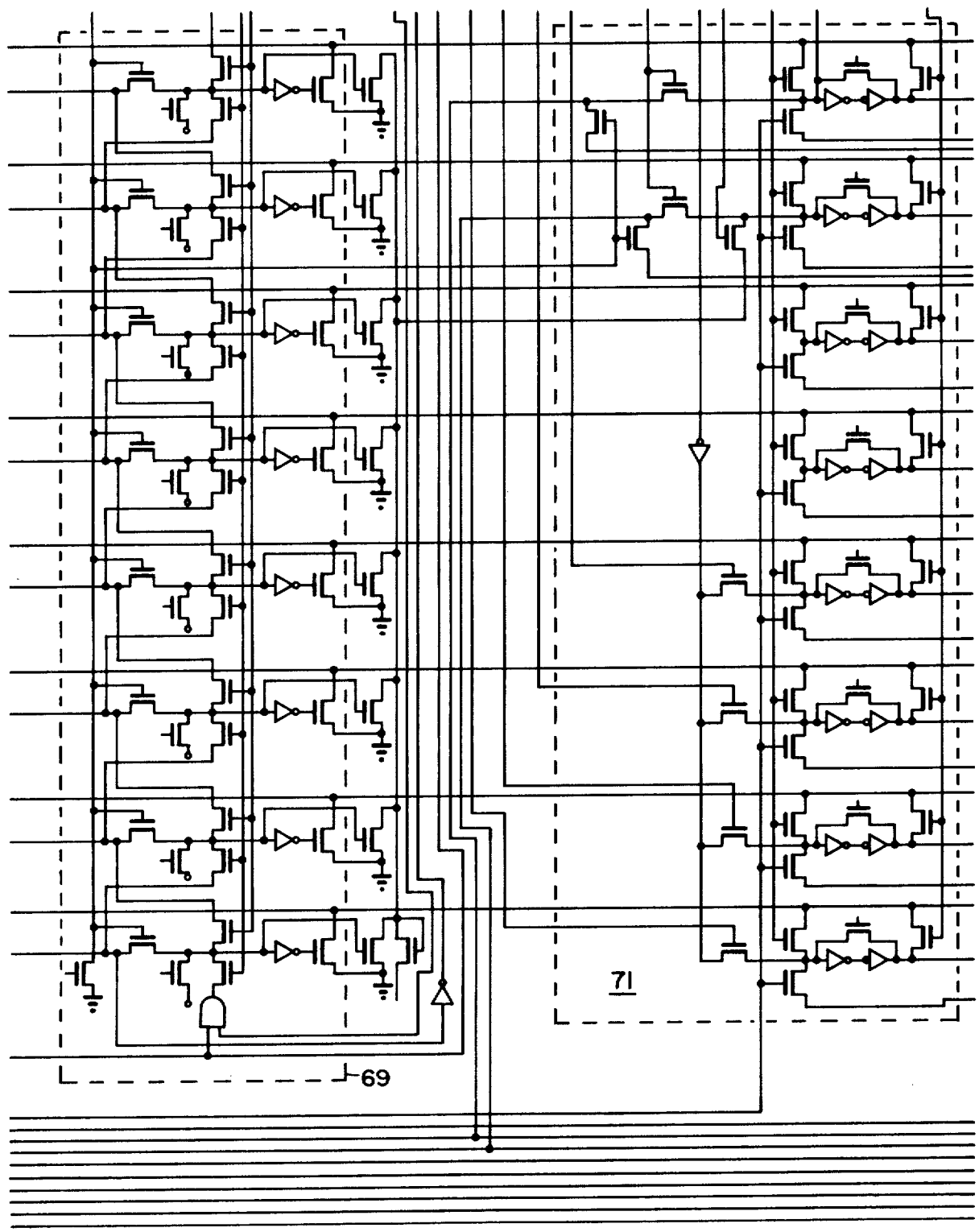
Figure 3S:
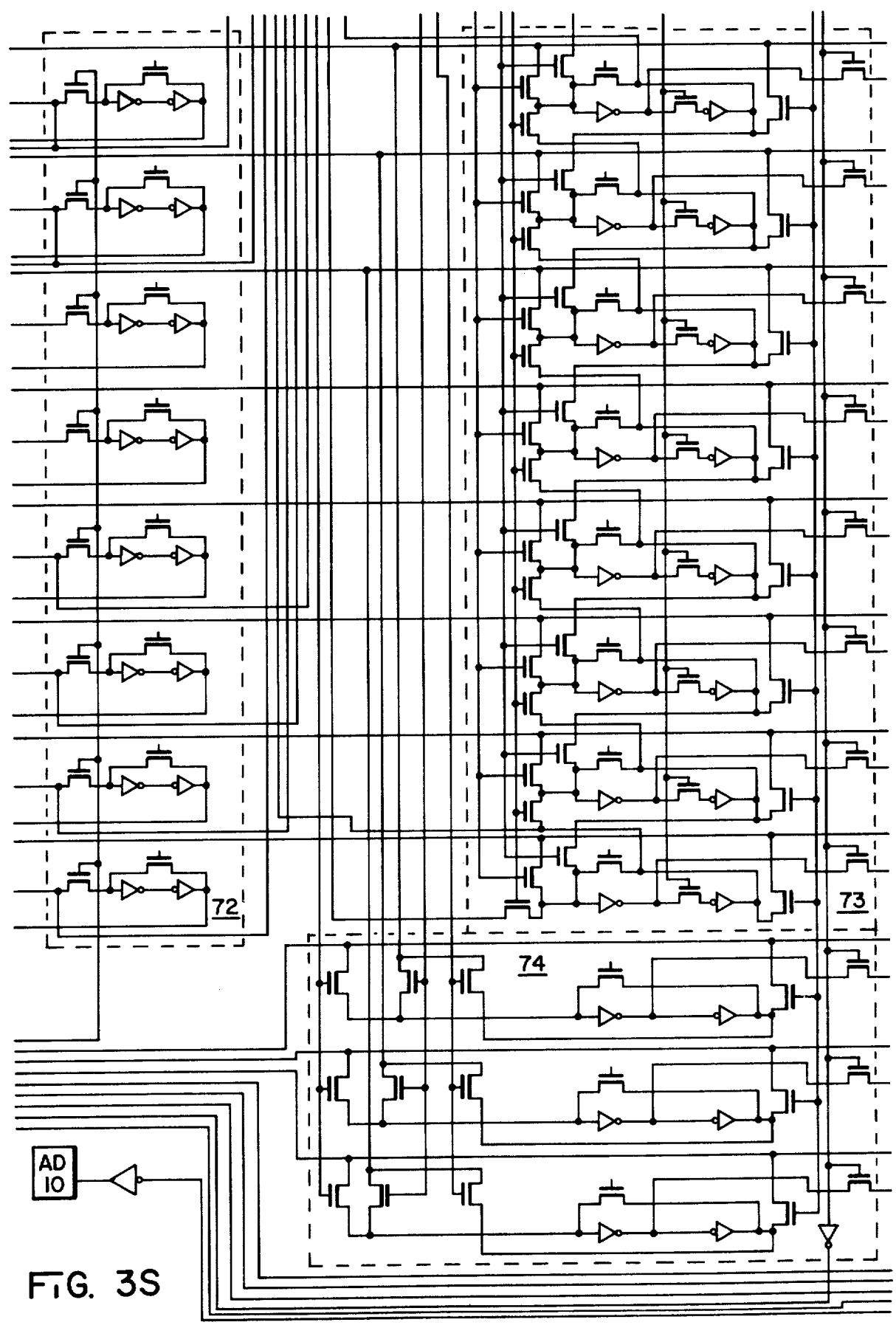
Figure 3T:
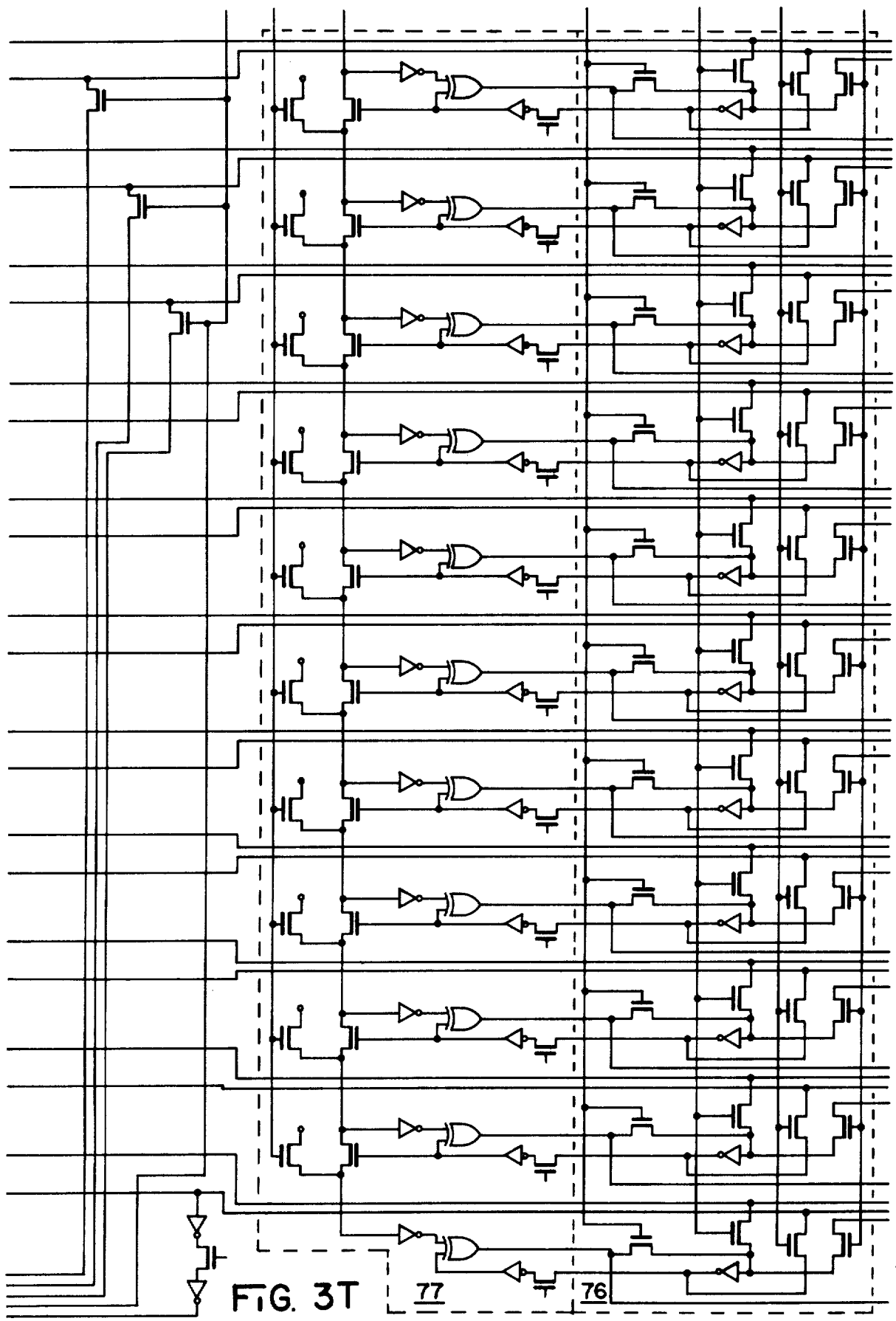
Figure 3U:
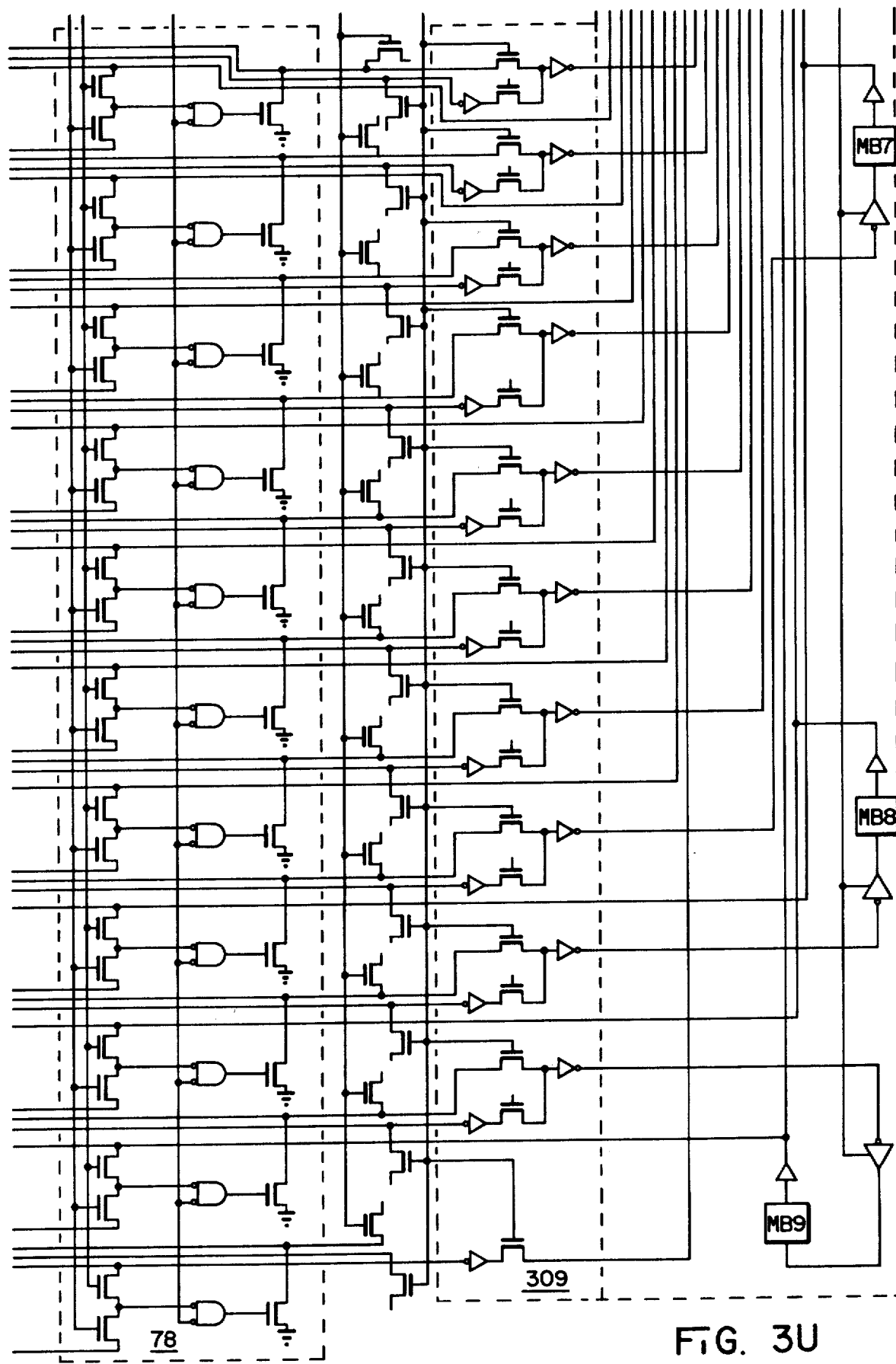

FIG. 3 shows in block diagram form how FIGS. 3A through 3U can be arranged to provide a logic diagram of a preferred embodiment of the present invention.

FIG. 3A shows register array 48 and a portion of register address selector 16 enclosed within the dotted lines. Terminal 300 receives a Reset pulse which is coupled by input buffer 301 to reset 43 shown on FIG. 3I.

FIG. 3B shows a portion of register address selector 16, register address decoder 49, and register address control 302. FIGS. 3C through 3F show instruction decode and control 11.

FIG. 3G shows K register 64, its stack register 63, and SOUT control 303. FIG. 3H shows stack pointer 46, stack pointer control 304, and register array control 305. FIG. 3I shows reset circuitry 43, page register 28, page stack 29, cycle counter 21, interrupt latch/mask 42, and multiply/divide counter 17. FIGS. 3J, 3K, and 3L show some of the control logic for instruction decode and control 11. FIGS. 3L and 3F also show instruction register 24. FIGS. 3F, 3L, and 3U show memory bus terminals MB0 through MB9.

FIG. 3M shows crystal inputs 307 and 308 coupled to a clock generator 306 by an oscillator shown between inputs 307 and 308. Command shift register 53 also appears on FIG. 3M. FIG. 3N shows capture registers 54 and 55, timer 56, and equality circuit 57. FIG. 3-O shows compare register 58, control register 47, status register 62, and real time terminals RT1, RT2, and RT3.

FIG. 3P shows interrupt priority and control 61, and AS stack register 66. FIG. 3Q shows A register 67, arithmetic and logic unit 13, and terminal AD11 along with control circuitry for AD11. FIG. 3R shows shifter 69 and F register 71. FIG. 3S shows terminal AD10, F register stack 72, memory extension ME register 74, and M register 73. FIG. 3T shows incrementor 77 and program counter 76. FIG. 3U shows temporary T register 78 and memory bus MB selector 309.

Figure 4:
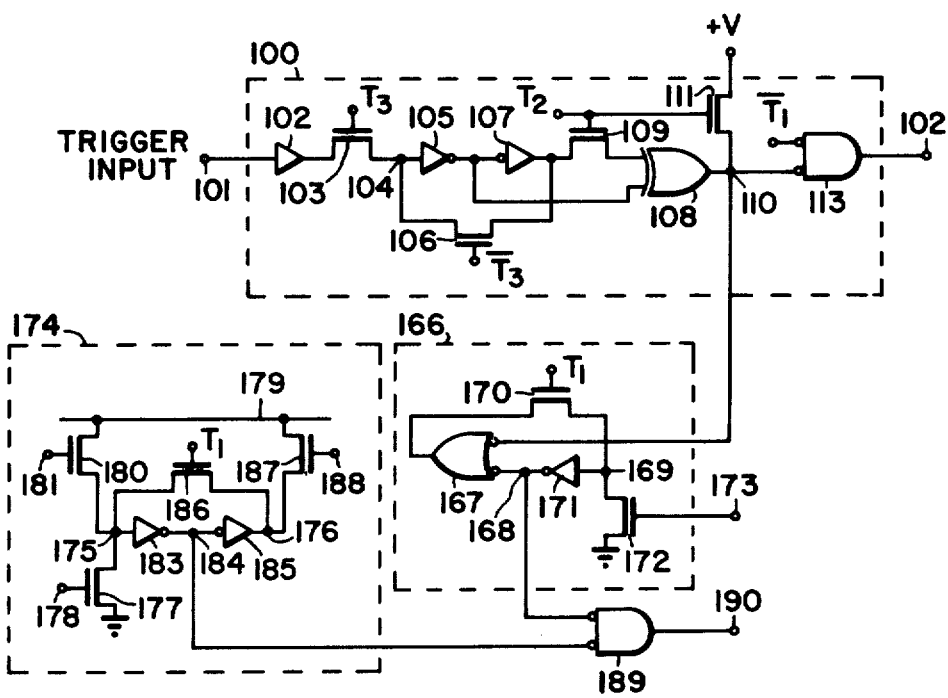
FIG. 4 is a logic/circuit diagram which includes a circuit for detecting the occurrence of a trigger signal and circuitry for selectively allowing an interruption of the microprocessor in response to the detected occurrence of the trigger signal.

In FIG. 4 circuitry is shown for detecting the occurrence of a trigger signal. The detection circuit enclosed within dashed lines 100 includes input terminal 101 and output terminal 102. The input signal received by input terminal 101 is received by a non-inverting buffer 102, the output of which is connected to coupling MOSFET 103. The gate of MOSFET 103 is controlled by internal clock signal $T_3$ such that the output of buffer 102 is conductively coupled to node 104 when signal $T_3$ is high. Node 104 is coupled to the input of first inverter gate 105, and node 104 is also coupled to feedback MOSFET 106. The output of inverter 105 is coupled to the input of a second inverter 107, the output of which is also connected to feedback MOSFET 106. The gate of MOSFET 106 is controlled by the complement of the internal clock $T_3$ signal such that the output of inverter 107 is conductively coupled to node 104 when signal $T_3$ is low, thus inverters 105, 107 and feedback MOSFET 106 form a latching circuit which is responsive to the logical state of the input terminal 101 during the time that $T_3$ is high and which latches the state on input terminal 101 when signal $T_3$ goes low.

The output of inverter 105 is also coupled to a first input of exclusive-OR gate 108. The output of inverter 107 is connected to a coupling MOSFET 109 which has a gate terminal controlled by internal clock signal $T_2$. When signal $T_2$ is high, the output of inverter 107 is conductively coupled to a second input of exclusive-OR gate 108. During the time that signal $T_2$ is high, inverter 107 and MOSFET 109 operate to charge the second input of exclusive-OR gate 108 to a high or low level corresponding to the output state of inverter 107. When signal $T_2$ returns to a low state, MOSFET 109 acts as a high impedance and the charge stored on the second input of exclusive-OR gate 108 is effective to maintain a high or a low logic level on this input until the time at which signal $T_2$ is again allowed to return to a high level.

Exclusive-OR gate 108 is effective to detect either a high to low transition or a low to high transition at input terminal 101. Assume that input 101 is at a high level during a first machine cycle when $T_3$ is high. During this first cycle, the input high level is coupled to node 104, inverted by inverter 105, and inverted again by inverter 107 such that the output of inverter 107 is at a high level. When $T_3$ turns low, the high level output of inverter 107 is coupled to the input of inverter 105 thereby latching the output of inverter 107 at a high level. It will now be assumed that during a second machine cycle the input signal received by input 101 has switched to a low level. While $T_2$ is high during the second machine cycle, a high level charge is stored at the second input of gate 108. Since the first input of gate 108 receives a low level from the output of inverter 105, the output of gate 108 will be a logic 1, or a high level. MOSFET 111, which is coupled between the output of gate 108 and the positive supply voltage and which is active when signal $T_2$ is high, aids in establishing a high level at the output of gate 108 during the time that signal $T_2$ is high. However, when signal $T_3$ is high during the second machine cycle, the low level now present at input 101 causes a high level to be output from inverter 105. Because both inputs of gate 108 are now high, the output of gate 108 is forced low indicating that an input transition or trigger signal has been detected. During a third machine cycle, a low level charge will be stored on the second input of gate 108 when signal $T_2$ is high, and the output of gate 108 returns to a high level. When signal $T_3$ goes high during this third machine cycle, a low input level is again coupled to node 104 and the high level previously latched on the output of inverter 105 is unchanged. Thus, the output of gate 108 remains high when signal $T_3$ is high and thereafter until input 101 is again switched to a high state.

Thus, whenever a transition occurs on input 101, the output of gate 108 will cause node 110 to be low from the time that $T_3$ goes high until the time that $T_2$ goes high on the following machine cycle. Node 110 is coupled to a first inverting input of logical AND gate 113. A second inverting input of AND gate 113 is connected to the complement of internal clock signal $T_1$. The output of gate 113 is coupled to output terminal 102. In order for output terminal 102 to be at a high level, both node 110 and signal $\overline{T_1}$ must be at low level. When the output signal provided at output terminal 102 is used to latch into a storage or capture register the time as presently indicated by the timer as will be explained with reference to FIG. 5.

Figure 5:
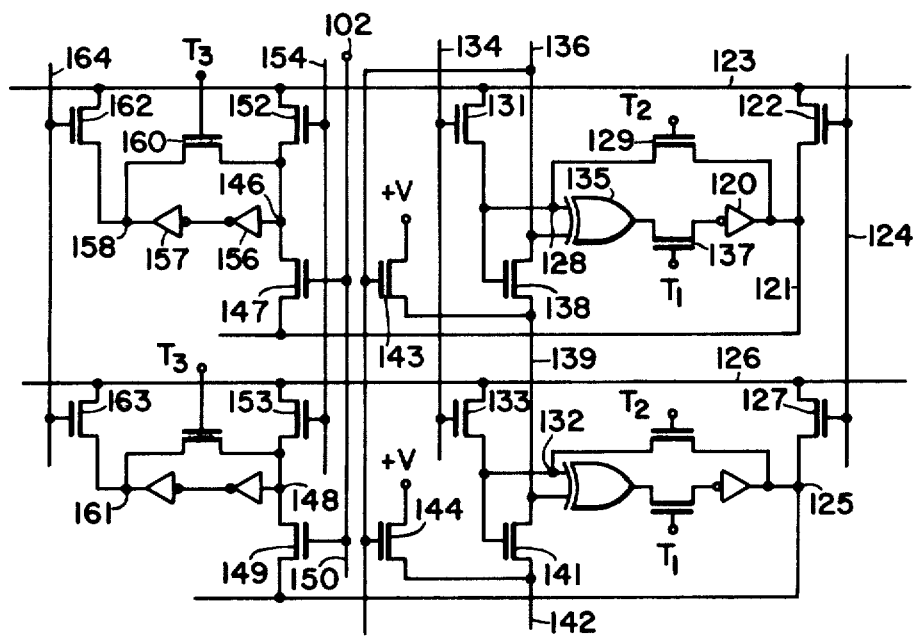
FIG. 5 is a logic/circuit diagram of a portion of the timer and a portion of the storage means according to the preferred embodiment of the invention.

In FIG. 5 the two least-significant bits of the timer are shown along with the two least-significant bits of a capture register according to the preferred embodiment of the invention. In the least significant bit of the timer, inverter 120 provides an output at node 121. MOSFET 122 is coupled between output node 121 and the least-significant bit of the data bus 123 and has its gate coupled to control line 124. Similarly, output node 125 of the next least-significant bit of the timer is coupled to the next least-significant data bus line 126 by MOSFET 127 which has its gate also coupled to control line 124. The logic state of control line 124 is determined by instruction decode and control block 11 (in FIG. 1) such that the output of the timer is driven onto the data bus when control line 124 is at a high level.

Output node 121 is also coupled to an input node 128 by MOSFET 129. The gate of MOSFET 129 is controlled by clock signal $T_2$ such that output node 121 is conductively coupled to input node 128 when signal $T_2$ is high. Input node 128 is also coupled to least-significant data bus line 123 by MOSFET 131. Similarly, in the next least-significant bit of the timer, input node 132 is coupled to next least-significant data bus line 126 by MOSFET 133. The gate terminals of MOSFET 131 and 133 are coupled to a control line 134. The logic state of control line 134 is determined by instruction decode and control block 11 such that the digital information present on the data bus is input to the timer when control line 134 is high. Gating within the instruction decode and control block 11 insures that control line 134 can go high only when internal clock signal $T_4$ is high. Although input nodes 128 and 132 are charged to match the logical state of output nodes 121 and 125, respectively, when internal clock $T_2$ is high, the charge on nodes 128 and 132 will be modified to correspond to the logical state of the data bus when $T_4$ goes high whenever a data bus-to-timer transfer is enabled by control line 134.

Input node 128 is coupled to a first input of logical exclusive-OR gate 135. The second input of gate 135 is coupled to conductor 136, which is initially assumed to conduct a logic "1" or high level. In this event, the output of exclusive-OR gate 135 is of the opposite logical state as that of node 128. The output of gate 135 is coupled to the input of inverter 120 by MOSFET 137 which has its gate controlled by internal clock signal $T_1$. When signal $T_1$ is high, the input of inverter 120 is charged to a logic "1" or logic "0" level as determined by the output of gate 135 such that the output of inverter 120 is the same logic state as node 128. Thus, gate 135, MOSFET 137, inverter 120 and feedback MOSFET 129 form a latching circuit for storing the least-significant bit of the timer.

However, if it is now assumed that conductor 136 is at a low level or logic "0," then the output of gate 135 is of the same logic state as input node 128. Now when internal clock signal $T_1$ goes high, the input of inverter 120 will be charged to the same logical state as that of node 128, and output node 121 will be the complement of the logic state of node 128. After $T_1$ returns low and $T_2$ goes high, the logic state of input node 128 will be inverted. Therefore, if conductor 136 is maintained at a low level, the logic state of the least-significant timer bit will be toggled once for every one machine cycle.

Input node 128 is also coupled to the gate terminal of MOSFET 138. MOSFET 138 is coupled between conductor 136 and conductor 139. The next least-significant bit of the timer operates similarly in that the logic state of this bit will also be toggled whenever conductor 139 is at a low logic level. However, in order for conductor 139 to be at a low logic level, conductor 136 must be at a low logic level and MOSFET 138 must be conductive, i.e., node 128 must be high. Thus, MOSFET 138 causes the next least-significant bit of the timer to toggle only half as often as the least-significant bit of the timer. Similarly, MOSFET 141 will couple a logic low level to conductor 142 only if both input nodes 128 and 132 are at a high level. Conductor 136 is also coupled to the gate terminals of precharge MOSFETs 143 and 144. When conductor 136 is at a high logic level, MOSFET 143 couples the positive supply voltage to conductor 139 and MOSFET 144 couples the positive supply voltage to conductor 142, thereby precharging these conductors to a high level. When conductor 136 returns to the low level, the least-significant bit of the timer will toggle when $T_1$ goes high. The remaining bits of the timer will toggle only if the low level on conductor 136 is coupled to the remaining stages by MOSFETs 138, 141, etc.

The logic state of conductor 136 is controlled by instruction decode and control block 11. The logic level of conductor 136 is forced to a high level during each machine cycle to insure that conductors 139, 142, and subsequent conductors in the incrementor chain are initialized to a high level during each machine cycle. As already mentioned the control logic in the preferred embodiment can be programmed at the factory using a metal mask option such that the timer is incremented once per machine cycle, once per every two machine cycles, or once per every four machine cycles. This is achieved by allowing the logic state of conductor 136 to be low during each occurrence of the internal clock $T_1$, during every second occurrence of the internal $T_1$ clock, or during every fourth occurrence of the $T_1$ internal clock, respectively.

In order to latch the state of the timer when a trigger signal is detected, output node 121 of the least significant bit of the timer is coupled to input node 146 of the least-significant bit of a capture register by MOSFET 147. Similarly, output node 125 is coupled to input node 148 by MOSFET 149. The gate terminals of MOSFETs 147 and 149 are coupled to control line 150 which in turn is coupled to terminal 102. It will be noted that terminal 102 is the output terminal of trigger signal detection circuit 100 shown in FIG. 4. Thus, when a trigger signal is detected, control line 150 is driven to a high level which thereby conductively couples output nodes 121 and 125 to input nodes 146 and 148, respectively. An important feature of the preferred embodiment is that the transfer of the timer output to the capture register input does not require the use of the data bus lines 123 and 126. This allows the recording of the time at which the trigger signal is detected without interfering with other operations being performed by the data processor which typically require the use of the data bus. However, it will be noted that input node 146 is coupled to data bus line 123 by MOSFET 152 and that input node 148 is coupled to data bus line 126 by MOSFET 153. The gate terminals of MOSFET 152 and 153 are coupled to control line 154 such that information present on the data bus can be presented to the input nodes of the capture register whenever instruction decode and control block 11 forces a high level on control line 154. This feature allows the capture register to be loaded from the data bus under software control.

Input node 146 is coupled to the input of inverter 156, and the output of inverter 156 is coupled to the input of inverter 157. The output of inverter 157 is coupled to output node 158 such that the logic state of the input node 146 is duplicated at output node 158. A feedback MOSFET 160 couples output node 158 back to input node 146. The gate terminal of MOSFET 160 is coupled to internal clock signal $T_3$ such that input node 146 is charged to a logic level corresponding to the logic level of output node 158 whenever internal clock signal $T_3$ is high. Thus, inverter 156, inverter 157, and feedback MOSFET 160 form a feedback latching circuit for storing a data bit. The next least-significant bit of the capture register has an output node 161 and functions in a similar manner.

Output nodes 158 and 161 of the capture register are coupled to data bus lines 123 and 126 by coupling MOSFETs 162 and 163, respectively. The gate terminals of MOSFETs 162 and 163 are coupled to control line 164 such that the output nodes of the capture register are conductively coupled to the data bus when instruction decode and control block 11 forces control line 164 to a high level. This feature allows the data bus to be driven from the capture register output under software control. Thus, MOSFETs 147 and 149 are a first input means coupled to the timer output nodes 121 and 125 and are controlled by the output of the detection circuit for causing the time output by the timer to be stored in the capture register when a trigger signal is detected. MOSFETs 162 and 163 are a means for coupling the output of the capture register to the data bus. MOSFETs 152 and 153 are a second input means coupled to the data bus for causing the capture register to store the data present on the data bus when control line 154 is at a high level.

Also shown in FIG. 4 is a means for effecting an interrupt within the data processor in response to the detection of the trigger signal. Within dashed block 166 a means is provided for indicating the status of detection circuit 100. Node 110 of detection circuit 100 is coupled to a first inverting input of OR gate 167. The second inverting input of gate 167 is coupled to node 168. The output of gate 167 is coupled to node 169 by MOSFET 170. The gate terminal of MOSFET 170 is coupled to internal clock signal $T_1$ such that node 169 is charged to a logic state corresponding to the output of gate 167 when signal $T_1$ is high. Node 169 is coupled to the input of inverter 171, and the output of inverter 171 is coupled to node 168. Assuming for the moment that node 110 is a logic high level, then inverter 171, gate 167, and MOSFET 170 form a feedback latching circuit for storing a digital state. However, when node 110 becomes a logic "0" level, the output of gate 167 is forced to a high level which is fed back to node 169 on the next occurrence of the internal clock signal $T_1$. As already mentioned in the discussion of detection circuit 100, node 110 goes to a low logic level only upon the detection of the occurrence of a transition at input terminal 101. Therefore, if status circuit 166 is initialized such that node 169 is initially low, then node 169 will remain low until the occurrence of a trigger signal is detected, after which time node 169 will be latched in the high state. MOSFET 172 couples node 169 to ground under the control of gate terminal input 173 thereby allowing the initialization of node 169 to a low logic level when terminal 173 is at a high level.

Within dashed block 174 is a means for controlling the generation of an interrupt in response to the logical state stored within status circuit 166. Control circuit 174 includes an input node 175 and an output node 176. Input node 175 can be initialized to a low logic level by MOSFET 177 which conductively couples input node 175 to ground when a reset signal applied to gate terminal 178 is at a high level. Input node 175 is also coupled to data bus line 179 by MOSFET 180 such that the logic state of input node 175 corresponds to the logic state of data bus line 179 when control terminal 181 is forced to a high level by instruction decode and control block 11. This allows the control circuit to be loaded from the data bus under software control.

Input node 175 is coupled to the input of inverter 183. The output of inverter 183 is coupled to node 184 and to the input of inverter 185. The output of inverter 185 is coupled to output node 176. Output node 176 is fed back to input node 175 by coupling MOSFET 186, the gate terminal of which is controlled by internal clock signal $T_1$. When signal $T_1$ is high, input node 175 is charged to a logical state corresponding to the logical state of the output of inverter 185. Thus, inverter 183, inverter 185, and feedback MOSFET 186 form a feedback latching circuit for storing a logical state of input node 175. Output node 176 is also coupled to data bus line 179 by MOSFET 187 which is controlled by gate terminal 188. When instruction decode and control block 11 forces terminal 188 to a high level, then output node 176 is conductively coupled to data bus line 179 thereby allowing the state of the control circuit to be driven onto the data bus under software control.

The logical state of status circuit 166 is gated with the logical state of control circuit 174 in order to effect a masking of an interrupt generated by the detection of an occurrence of the trigger signal. Logical AND gate 189 is effective to perform this masking function. Node 168 of status circuit 166 is coupled to a first inverting input of gate 189. Node 184 of control circuit 174 is coupled to the second inverting input of gate 189. The output of gate 189 is coupled to interrupt terminal 190 which is forced to a high state when an interrupt is to occur. When it is desired to block an interrupt responsive to the detection of the trigger signal, the software causes a logic "1" level to be latched on node 184. This causes interrupt terminal 190 to be forced to a logic low level regardless of the logic state of node 168. At a later time, when it is more convenient for the data processor to respond to an interrupt, a software instruction causes node 184 to latch a low logic level which enables gate 189. If a trigger signal has already been detected then node 168 will already be at a low level and an interrupt will immediately be generated. If a trigger signal has not already been detected then an interrupt will be generated immediately upon the detection of the trigger signal. Instruction decode and control block 11 is designed such that a high level on interrupt terminal 190 causes a high level to be forced on reset terminal 173 for resetting the status circuit 166 which allows status circuit 166 to record the next detection of a trigger signal by detection circuit 100.

The detection and interrupt circuitry described with reference to FIG. 4 allows the capture register to record the time at which the trigger signal is detected and defer the interruption of the data processor until such later time as an interrupt is convenient for responding to the occurrence of the detected trigger signal.

While the invention has been described with reference to a preferred embodiment, the description is for illustrative purposes and is not to be construed as limiting the scope of the invention. Various modifications and changes may occur to those skilled in the art without departing from the true spirit and scope of the invention as defined by the appended claims.

What is claimed is:

1. A microprocessor comprising a data bus, an address bus, a plurality of registers for storing digital information to effect operation of said microprocessor, an arithmetic logic unit for performing computations on digital information to effect operation of said microprocessor, control means coupled to said plurality of registers and to said arithmetic logic unit for controlling the transfer of digital information in said registers and said arithmetic logic unit and over said data and address busses, a plurality of pins for coupling said microprocessor to a power supply and to external devices, said microprocessor being an integrated circuit on a monolithic semiconductor substrate, said microprocessor further comprising a time capture means, said time capture means comprising:
   (a) timer means responsive to a source of successive clock signals, said timer means providing a first digital output signal representative of time,
   (b) means for detecting an occurrence of a trigger signal received at a predetermined one of said microprocessor pins
   (c) at least one storage means for storing digital information and having first input means and output means, said first input means being coupled to said timer means and responsive to said detection means for storing in said at least one storage means said first digital output signal upon the occurrence of said trigger signal, said output means providing a second digital output signal representative of the digital information stored in said at least one storage means.

2. A microprocessor as recited in claim 1 wherein said microprocessor is capable of executing a plurality of instructions stored in a memory, said microprocessor further comprising an instruction decoder responsive to said plurality of instructions for generating control signals.

3. A microprocessor as recited in claim 2 wherein said output means is responsive to a first control signal for enabling said second digital output signal onto said data bus.

4. A microprocessor as recited in claim 2 wherein said timer means comprises means responsive to a second control signal for enabling said first digital output signal onto said data bus.

5. A microprocessor as recited in claim 2 wherein said timer means comprises means responsive to a third control signal for loading said timer means with a time represented by digital information on said data bus.

6. A microprocessor as recited in claim 2 wherein said at least one storage means comprises means responsive to a fourth control signal for storing digital information on said data bus into said at least one storage means.

7. A microprocessor as recited in claim 1 wherein said microprocessor is capable of executing a plurality of instructions stored in a memory, said microprocessor further comprising interrupt means coupled to said detecting means, said interrupt means effecting an interrupt in the execution of said plurality of instructions in response to a detection of the occurrence of the trigger signal.

8. A microprocessor as recited in claim 7 wherein said interrupt means comprises:
   (a) status means responsive to said detecting means, said status means having a first and a second logical state and being in the first logical state before the occurrence of the trigger signal is detected and being in the second logical state after the occurrence of the trigger signal is detected,
   (b) control means coupled to the data bus for storing digital information, and
   (c) masking means coupled to said status means and responsive to said control means for selectively enabling the interruption in the execution of said plurality of instructions.

9. A microprocessor as recited in claim 1 wherein said detecting means is responsive to a binary valued input on said predetermined pin having first and second states, an occurrence of a trigger signal being detected upon a transition of the binary valued input from the first state to the second state.

10. A microprocessor as recited in claim 9 wherein an occurrence of a trigger signal is also detected upon a transition of the binary valued input from the second state to the first state.

11. A microprocessor as recited in claim 1 wherein said timer means comprises a counter responsive to the succession of clock signals, said counter being incremented at a continuous rate.

12. A microprocessor as recited in claim 11 wherein said counter comprises a timer register and an incrementer, said incrementer being responsive to the succession of clock signals for incrementing the timer register at a continuous rate equal to N·f, where N represents a positive integer and f represents the frequency of said clock signals.

13. A microprocessor as recited in claim 12 wherein said timer register and said incrementer comprise MOSFET devices.

* * * * *